US009633005B2

(12) United States Patent
Danielyan et al.

(10) Patent No.: US 9,633,005 B2
(45) Date of Patent: Apr. 25, 2017

(54) EXHAUSTIVE AUTOMATIC PROCESSING OF TEXTUAL INFORMATION

(71) Applicant: ABBYY InfoPoisk LLC, Moscow (RU)

(72) Inventors: Tatiana Danielyan, Moscow (RU); Anatoly Starostin, Moscow (RU); Konstantin Zuev, Moscow (RU); Konstantin Anisimovich, Moscow (RU); Vladimir Selegey, Moscow (RU)

(73) Assignee: ABBYY InfoPoisk LLC (RU)

( * ) Notice: Subject to any disclaimer, the term of this patent is extended or adjusted under 35 U.S.C. 154(b) by 2 days.

(21) Appl. No.: 14/509,492

(22) Filed: Oct. 8, 2014

(65) Prior Publication Data

US 2015/0057992 A1 Feb. 26, 2015

Related U.S. Application Data

(63) Continuation-in-part of application No. 13/288,953, filed on Nov. 3, 2011, which is a continuation-in-part (Continued)

(30) Foreign Application Priority Data

Jan. 23, 2014 (RU) .................................. 2014102111

(51) Int. Cl.
*G06F 17/27* (2006.01)
*G06F 17/28* (2006.01)

(52) U.S. Cl.
CPC ........ *G06F 17/2785* (2013.01); *G06F 17/271* (2013.01); *G06F 17/277* (2013.01); *G06F 17/2755* (2013.01); *G06F 17/2872* (2013.01)

(58) Field of Classification Search
CPC .................................. G06F 17/27; G06F 17/28
(Continued)

(56) References Cited

U.S. PATENT DOCUMENTS 4,706,212 A    11/1987   Toma
5,068,789 A    11/1991   Van Vliembergen
(Continued)

FOREIGN PATENT DOCUMENTS

EP       2400400 A1    12/2001
EP       1365329 B1    10/2009
(Continued)

OTHER PUBLICATIONS

Bolshakov, "Co-Ordinative Ellipsis in Russian Texts: Problems of Description and Restoration", Published in: Proceeding Coling '88 Proceedings of the 12th conference on Computational linguistics—vol. 1 doi>10.3115/991635.991649, 1988, 65-67.
(Continued)

*Primary Examiner* — Jesse Pullias
(74) *Attorney, Agent, or Firm* — Veronica Weinstein

(57) ABSTRACT

A system for natural language processing is provided. A first natural language processing program may be constructed using language-independent semantic descriptions, and language-dependent morphological descriptions, lexical descriptions, and syntactic descriptions of one or more target languages. The natural language processing program may include any of machine translation, fact extraction, semantic indexing, semantic search, sentiment analysis, document classification, summarization, big data analysis, or another program. Additional sets of natural language processing programs may be constructed.

12 Claims, 18 Drawing Sheets

Related U.S. Application Data of application No. 11/548,214, filed on Oct. 10, 2006, now Pat. No. 8,078,450.

(58) Field of Classification Search
 USPC .......................................................... 704/2–8
 See application file for complete search history.

(56) References Cited

U.S. PATENT DOCUMENTS

| | | |
|---|---|---|
| 5,128,865 A | 7/1992 | Sadler |
| 5,146,405 A | 9/1992 | Church |
| 5,175,684 A | 12/1992 | Chong |
| 5,268,839 A | 12/1993 | Kaji |
| 5,301,109 A | 4/1994 | Landauer et al. |
| 5,386,536 A | 1/1995 | Courts et al. |
| 5,386,556 A | 1/1995 | Hedin et al. |
| 5,418,717 A | 5/1995 | Su et al. |
| 5,426,583 A | 6/1995 | Uribe-Echebarria Diaz De Mendibi |
| 5,475,587 A | 12/1995 | Anick et al. |
| 5,477,451 A | 12/1995 | Brown et al. |
| 5,490,061 A | 2/1996 | Tolin et al. |
| 5,497,319 A | 3/1996 | Chong et al. |
| 5,510,981 A | 4/1996 | Berger et al. |
| 5,550,934 A | 8/1996 | Van Vliembergen et al. |
| 5,559,693 A | 9/1996 | Anick et al. |
| 5,669,007 A | 9/1997 | Tateishi |
| 5,677,835 A | 10/1997 | Carbonell et al. |
| 5,678,051 A | 10/1997 | Aoyama |
| 5,687,383 A | 11/1997 | Nakayama et al. |
| 5,696,980 A | 12/1997 | Brew |
| 5,715,468 A | 2/1998 | Budzinski |
| 5,721,938 A | 2/1998 | Stuckey |
| 5,724,593 A | 3/1998 | Hargrave et al. |
| 5,729,741 A | 3/1998 | Liaguno et al. |
| 5,737,617 A | 4/1998 | Bernth et al. |
| 5,752,051 A | 5/1998 | Cohen |
| 5,768,603 A | 6/1998 | Brown et al. |
| 5,784,489 A | 7/1998 | Van Vliembergen et al. |
| 5,787,410 A | 7/1998 | McMahon |
| 5,794,050 A | 8/1998 | Dahlgren et al. |
| 5,794,177 A | 8/1998 | Carus et al. |
| 5,826,219 A | 10/1998 | Kutsumi |
| 5,826,220 A | 10/1998 | Takeda et al. |
| 5,848,385 A | 12/1998 | Poznanski et al. |
| 5,867,811 A | 2/1999 | O'Donoghue |
| 5,873,056 A | 2/1999 | Liddy et al. |
| 5,884,247 A | 3/1999 | Christy |
| 5,995,920 A | 11/1999 | Carbonell et al. |
| 6,006,221 A | 12/1999 | Liddy et al. |
| 6,055,528 A | 4/2000 | Evans |
| 6,076,051 A | 6/2000 | Messerly et al. |
| 6,081,774 A | 6/2000 | De Hita et al. |
| 6,161,083 A | 12/2000 | Franz et al. |
| 6,182,028 B1 | 1/2001 | Karaali et al. |
| 6,185,592 B1 * | 2/2001 | Boguraev ............ G06F 17/2745 704/9 |
| 6,223,150 B1 | 4/2001 | Duan et al. |
| 6,233,544 B1 | 5/2001 | Alshawi |
| 6,233,546 B1 | 5/2001 | Datig |
| 6,243,669 B1 | 6/2001 | Horiguchi |
| 6,243,670 B1 | 6/2001 | Bessho et al. |
| 6,243,689 B1 | 6/2001 | Norton |
| 6,243,723 B1 | 6/2001 | Ikeda et al. |
| 6,246,977 B1 | 6/2001 | Messerly et al. |
| 6,260,008 B1 | 7/2001 | Sanfilippo |
| 6,266,642 B1 | 7/2001 | Franz et al. |
| 6,275,789 B1 | 8/2001 | Moser et al. |
| 6,278,967 B1 | 8/2001 | Akers et al. |
| 6,282,507 B1 | 8/2001 | Horiguchi et al. |
| 6,285,978 B1 | 9/2001 | Bernth et al. |
| 6,330,530 B1 | 12/2001 | Horiguchi et al. |
| 6,345,245 B1 | 2/2002 | Sugiyama et al. |
| 6,349,276 B1 | 2/2002 | McCarley et al. |
| 6,356,864 B1 | 3/2002 | Foltz et al. |
| 6,356,865 B1 | 3/2002 | Franz et al. |
| 6,381,598 B1 | 4/2002 | Williamowski et al. |
| 6,393,389 B1 | 5/2002 | Chanod et al. |
| 6,442,524 B1 | 8/2002 | Ecker et al. |
| 6,463,404 B1 | 10/2002 | Appleby |
| 6,470,306 B1 | 10/2002 | Pringle et al. |
| 6,523,026 B1 | 2/2003 | Gillis et al. |
| 6,529,865 B1 | 3/2003 | Duan et al. |
| 6,601,026 B2 | 7/2003 | Appelt et al. |
| 6,604,101 B1 | 8/2003 | Chan et al. |
| 6,622,123 B1 | 9/2003 | Chanod et al. |
| 6,658,627 B1 | 12/2003 | Gallup et al. |
| 6,721,697 B1 | 4/2004 | Duan et al. |
| 6,760,695 B1 | 7/2004 | Kuno et al. |
| 6,778,949 B2 | 8/2004 | Duan et al. |
| 6,871,174 B1 | 3/2005 | Dolan et al. |
| 6,871,199 B1 | 3/2005 | Binnig et al. |
| 6,901,399 B1 | 5/2005 | Corston et al. |
| 6,901,402 B1 | 5/2005 | Corston-Oliver et al. |
| 6,928,407 B2 | 8/2005 | Ponceleon et al. |
| 6,928,448 B1 | 8/2005 | Franz et al. |
| 6,937,974 B1 | 8/2005 | D'Agostini |
| 6,947,923 B2 | 9/2005 | Cha et al. |
| 6,965,857 B1 | 11/2005 | Decary |
| 6,983,240 B2 | 1/2006 | Ait-Mokhtar et al. |
| 6,986,104 B2 | 1/2006 | Green et al. |
| 7,013,264 B2 | 3/2006 | Dolan et al. |
| 7,020,601 B1 | 3/2006 | Hummel et al. |
| 7,027,974 B1 | 4/2006 | Busch et al. |
| 7,050,964 B2 | 5/2006 | Menzes et al. |
| 7,085,708 B2 | 8/2006 | Manson et al. |
| 7,132,445 B2 | 11/2006 | Taveras et al. |
| 7,146,358 B1 | 12/2006 | Gravano et al. |
| 7,167,824 B2 | 1/2007 | Kallulli |
| 7,191,115 B2 | 3/2007 | Moore |
| 7,200,550 B2 | 4/2007 | Menezes et al. |
| 7,263,488 B2 | 8/2007 | Chu et al. |
| 7,269,594 B2 | 9/2007 | Corston-Oliver et al. |
| 7,346,493 B2 | 3/2008 | Ringger et al. |
| 7,356,457 B2 | 4/2008 | Pinkham et al. |
| 7,409,404 B2 | 8/2008 | Gates |
| 7,461,056 B2 | 12/2008 | Cao et al. |
| 7,466,334 B1 | 12/2008 | Baba et al. |
| 7,475,015 B2 | 1/2009 | Epstein et al. |
| 7,619,656 B2 | 11/2009 | Ben-Ezra et al. |
| 7,672,830 B2 | 3/2010 | Goutte et al. |
| 7,672,831 B2 | 3/2010 | Todhunter et al. |
| 7,739,102 B2 | 6/2010 | Bender |
| 8,078,450 B2 | 12/2011 | Anisimovich et al. |
| 8,145,473 B2 | 3/2012 | Anisimovich et al. |
| 8,214,199 B2 | 7/2012 | Anismovich et al. |
| 8,229,730 B2 | 7/2012 | Van Den Berg et al. |
| 8,229,944 B2 | 7/2012 | Latzina et al. |
| 8,260,049 B2 | 9/2012 | Deryagin et al. |
| 8,266,077 B2 | 9/2012 | Handley |
| 8,271,453 B1 | 9/2012 | Pasca et al. |
| 8,285,728 B1 | 10/2012 | Rubin |
| 8,300,949 B2 | 10/2012 | Xu |
| 8,301,633 B2 | 10/2012 | Cheslow |
| 8,402,036 B2 | 3/2013 | Blair-Goldensohn et al. |
| 8,533,188 B2 | 9/2013 | Yan et al. |
| 8,548,951 B2 | 10/2013 | Solmer et al. |
| 8,554,558 B2 | 10/2013 | McCarley et al. |
| 8,577,907 B1 | 11/2013 | Singhal et al. |
| 8,856,096 B2 | 10/2014 | Marchisio et al. |
| 2001/0014902 A1 | 8/2001 | Hu et al. |
| 2001/0029442 A1 | 10/2001 | Shiotsu et al. |
| 2001/0029455 A1 | 10/2001 | Chin et al. |
| 2002/0040292 A1 | 4/2002 | Marcu |
| 2003/0145285 A1 | 7/2003 | Miyahira et al. |
| 2003/0158723 A1 | 8/2003 | Masuichi et al. |
| 2003/0176999 A1 | 9/2003 | Calcagno et al. |
| 2003/0182102 A1 | 9/2003 | Corston-Oliver et al. |
| 2003/0204392 A1 | 10/2003 | Finnigan et al. |
| 2004/0034520 A1 | 2/2004 | Langkilde-Geary et al. |
| 2004/0064438 A1 | 4/2004 | Kostoff |
| 2004/0098247 A1 | 5/2004 | Moore |
| 2004/0122656 A1 | 6/2004 | Abir |
| 2004/0172235 A1 | 9/2004 | Pinkham et al. |

(56) References Cited

U.S. PATENT DOCUMENTS

| | | |
|---|---|---|
| 2004/0193401 A1 | 9/2004 | Ringger et al. |
| 2004/0254781 A1 | 12/2004 | Appleby |
| 2004/0261016 A1 | 12/2004 | Glass et al. |
| 2005/0010421 A1 | 1/2005 | Watanabe et al. |
| 2005/0015240 A1 | 1/2005 | Appleby |
| 2005/0080613 A1 | 4/2005 | Colledge et al. |
| 2005/0086047 A1 | 4/2005 | Uchimoto et al. |
| 2005/0137853 A1 | 6/2005 | Appleby |
| 2005/0155017 A1 | 7/2005 | Berstis et al. |
| 2005/0171757 A1 | 8/2005 | Appleby |
| 2005/0209844 A1 | 9/2005 | Wu et al. |
| 2005/0240392 A1 | 10/2005 | Munro, Jr. et al. |
| 2006/0004563 A1 | 1/2006 | Campbell et al. |
| 2006/0004653 A1 | 1/2006 | Strongin |
| 2006/0080079 A1 | 4/2006 | Yamabana |
| 2006/0095250 A1 | 5/2006 | Chen et al. |
| 2006/0217964 A1 | 9/2006 | Kamatani et al. |
| 2006/0224378 A1 | 10/2006 | Chino et al. |
| 2006/0293876 A1 | 12/2006 | Kamatani et al. |
| 2007/0010990 A1 | 1/2007 | Woo |
| 2007/0016398 A1 | 1/2007 | Buchholz |
| 2007/0083359 A1 | 4/2007 | Bender |
| 2007/0083505 A1 | 4/2007 | Ferrari et al. |
| 2007/0094006 A1 | 4/2007 | Todhunter et al. |
| 2007/0100601 A1 | 5/2007 | Kimura |
| 2007/0203688 A1 | 8/2007 | Fuji et al. |
| 2007/0250305 A1 | 10/2007 | Maxwell |
| 2008/0133218 A1 | 6/2008 | Zhou et al. |
| 2008/0228464 A1 | 9/2008 | Al-Onaizan et al. |
| 2008/0319947 A1 | 12/2008 | Latzina et al. |
| 2009/0063472 A1 | 3/2009 | Pell et al. |
| 2009/0070094 A1 | 3/2009 | Best et al. |
| 2010/0082324 A1 | 4/2010 | Itagaki et al. |
| 2011/0055188 A1 | 3/2011 | Gras |
| 2011/0072021 A1 | 3/2011 | Lu et al. |
| 2011/0257963 A1* | 10/2011 | Zuev .................. G06F 17/2775 704/9 |
| 2011/0258181 A1 | 10/2011 | Brdiczka et al. |
| 2011/0301941 A1 | 12/2011 | De Vocht |
| 2012/0023104 A1 | 1/2012 | Johnson et al. |
| 2012/0030226 A1 | 2/2012 | Holt et al. |
| 2012/0131060 A1 | 5/2012 | Heidasch et al. |
| 2012/0197628 A1 | 8/2012 | Best et al. |
| 2012/0197885 A1 | 8/2012 | Patterson |
| 2012/0203777 A1 | 8/2012 | Laroco, Jr. et al. |
| 2012/0221553 A1 | 8/2012 | Wittmer et al. |
| 2012/0246153 A1 | 9/2012 | Pehle |
| 2012/0296897 A1 | 11/2012 | Xin-Jing et al. |
| 2012/0310627 A1 | 12/2012 | Qi et al. |
| 2013/0013291 A1 | 1/2013 | Bullock et al. |
| 2013/0054589 A1 | 2/2013 | Cheslow |
| 2013/0091113 A1 | 4/2013 | Gras |
| 2013/0138696 A1 | 5/2013 | Turdakov et al. |
| 2013/0144592 A1 | 6/2013 | Och et al. |
| 2013/0144594 A1 | 6/2013 | Bangalore et al. |
| 2013/0185307 A1 | 7/2013 | El-Yaniv et al. |
| 2013/0254209 A1 | 9/2013 | Kang et al. |
| 2013/0282703 A1 | 10/2013 | Puterman-Sobe et al. |
| 2013/0311487 A1 | 11/2013 | Moore et al. |
| 2013/0318095 A1 | 11/2013 | Harold |
| 2014/0012842 A1 | 1/2014 | Yan et al. |

FOREIGN PATENT DOCUMENTS

| | | |
|---|---|---|
| WO | 2009087431 | 7/2009 |
| WO | 2011160204 A1 | 12/2011 |

OTHER PUBLICATIONS

Hutchins, "Machine Translation: past, present, future", (Ellis Horwood Series in Computers and their Applications) Ellis Horwood: Chichester, 1986, 382 pp. ISBN 0-85312-788-3, $49.95 (hb).

Mitamura, et al., "An Efficient Interlingua Translation System for Multi-Lingual Document Production", http://citeseerx.ist.psu.edu/viewdoc/summary?doi=10.1.1.44.5702, Jul. 1, 1991.

* cited by examiner

| This | boy | is | smart | , | he' | ll | succeed | in | life | . |
|---|---|---|---|---|---|---|---|---|---|---|
| this <Pronoun, GTNoun, PersonThird> | boy <Noun, Masc, Nominativ, GTNoun, Singular> | be <Verb, GTVerb, Singular, PersonThird, ZeroType, Present, Nonnegative, NoCompositeness> | smart <Adjective, DegreePositive, GTAdjectiveAttr, FullComparison> | | he <Pronoun, Nominative \| Accusative, GTNoun, Masculine, Singular, PersonThird, RCPersonal, Unreflexive> | shall <Verb, GTVerbModal, ZeroType, Present, Nonnegative, Composite_ll> | succeed <Verb, GTInfinitive, NumberZero, PersonZero, ZeroType, TenseZero, Nonnegative> | in <Adverb, GTAdverb> | life <Adjective, DegreePositive, GTAdjectiveAttr> | |
| this <Invariable> | | be <Verb, GTVerb, Singular, PersonThird, ZeroType, Present, Nonnegative, Regular, Composite_for_t> | smart <Verb, GTVerb, Singular, PersonFirst \| PersonSecond, ZeroType, Present, Nonnegative, NoCompositeness> | | | will <Verb, GTVerbModal, ZeroType, Present, Nonnegative, Irregular, Composite_ll> | succeed <Verb, GTVerb, Singular, PersonFirst \| PersonSecond, ZeroType, Present, Nonnegative, NoCompositeness> | in <Preposition> | life <Noun, Nominative \| Accusative, GTNoun, Singular> | |
| this <Pronoun, GTAdjectiveAttr, Singular, RCDemonstrative> | | | smart <Verb, GTVerb, Plural, ZeroType, Present, Nonnegative, NoCompositeness> | | | | succeed <Verb, GTInfinitive, NumberZero, PersonZero, ZeroType, TenseZero, Nonnegative> | | | |
| | | | smart <Verb, GTInfinitive, NumberZero, PersonZero, ZeroType, TenseZero, Nonnegative> | | | | | | | |
| | | | smart <Adverb, DegreePositive, GTAdverb, FullComparison> | | | | | | | |
| | | | smart <Noun, Nominative \| Accusative, GTNoun, Singular> | | | | | | | |

FIG. 2C

EXHAUSTIVE AUTOMATIC PROCESSING OF TEXTUAL INFORMATION

CROSS REFERENCE TO RELATED APPLICATIONS

This application is a Continuation-In-Part of U.S. patent application Ser. No. 13/288,953, filed Nov. 3, 2011 which is a Continuation-In-Part of U.S. application Ser. No. 11/548,214, filed Oct. 10, 2006, now U.S. Pat. No. 8,078,450, issued Dec. 13, 2011. This application also claims the benefit of priority under 35 USC 119 to Russian Patent Application No. 2014102111, filed Jan. 23, 2014; the disclosure of which is incorporated herein by reference.

BACKGROUND

There is a rapid increase in the quantity of unstructured information represented in electronic form. For example, unstructured information is readily present on the Internet. This information may include text, other data such as numbers, dates, etc. Ambiguities and irregularities in the information often make it challenging to interpret this information. Additionally, there is a need to extract and process information from speech (audio files) and video.

SUMMARY

An exemplary embodiment relates to method for natural language processing. The method includes receiving a semantic hierarchy of language-independent semantic descriptions of a natural language relevant to any natural language. The method includes creating language dependent morphological descriptions, lexical descriptions, and syntactic descriptions of one or more target language. The method includes constructing a first natural language processing program based on the language-independent semantic descriptions, the language-dependent morphological descriptions, lexical descriptions, and syntactic descriptions of the one or more target languages Another exemplary embodiment relates to a system. The system includes one or more data processors. The system further includes one or more storage devices storing instructions that, when executed by the one or more data processors, cause the one or more data processors to perform operations comprising: receiving a semantic hierarchy of language-independent semantic descriptions of a natural language relevant to any natural language; creating language dependent morphological descriptions, lexical descriptions, and syntactic descriptions of one or more target language; and constructing a first natural language processing program based on the language-independent semantic descriptions, the language-dependent morphological descriptions, lexical descriptions, and syntactic descriptions of the one or more target languages.

Yet another exemplary embodiment relates to computer readable storage medium having machine instructions stored therein, the instructions being executable by a processor to cause the processor to perform operations comprising: receiving a semantic hierarchy of language-independent semantic descriptions of a natural language relevant to any natural language; creating language dependent morphological descriptions, lexical descriptions, and syntactic descriptions of one or more target language; and constructing a first natural language processing program based on the language-independent semantic descriptions, the language-dependent morphological descriptions, lexical descriptions, and syntactic descriptions of the one or more target languages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIG. 2C illustrates an example of the lexical-morphological structure of a sentence according to one or more embodiments;

Like reference numbers and designations in the various drawings indicate like elements.

DETAILED DESCRIPTION

Figure 1:
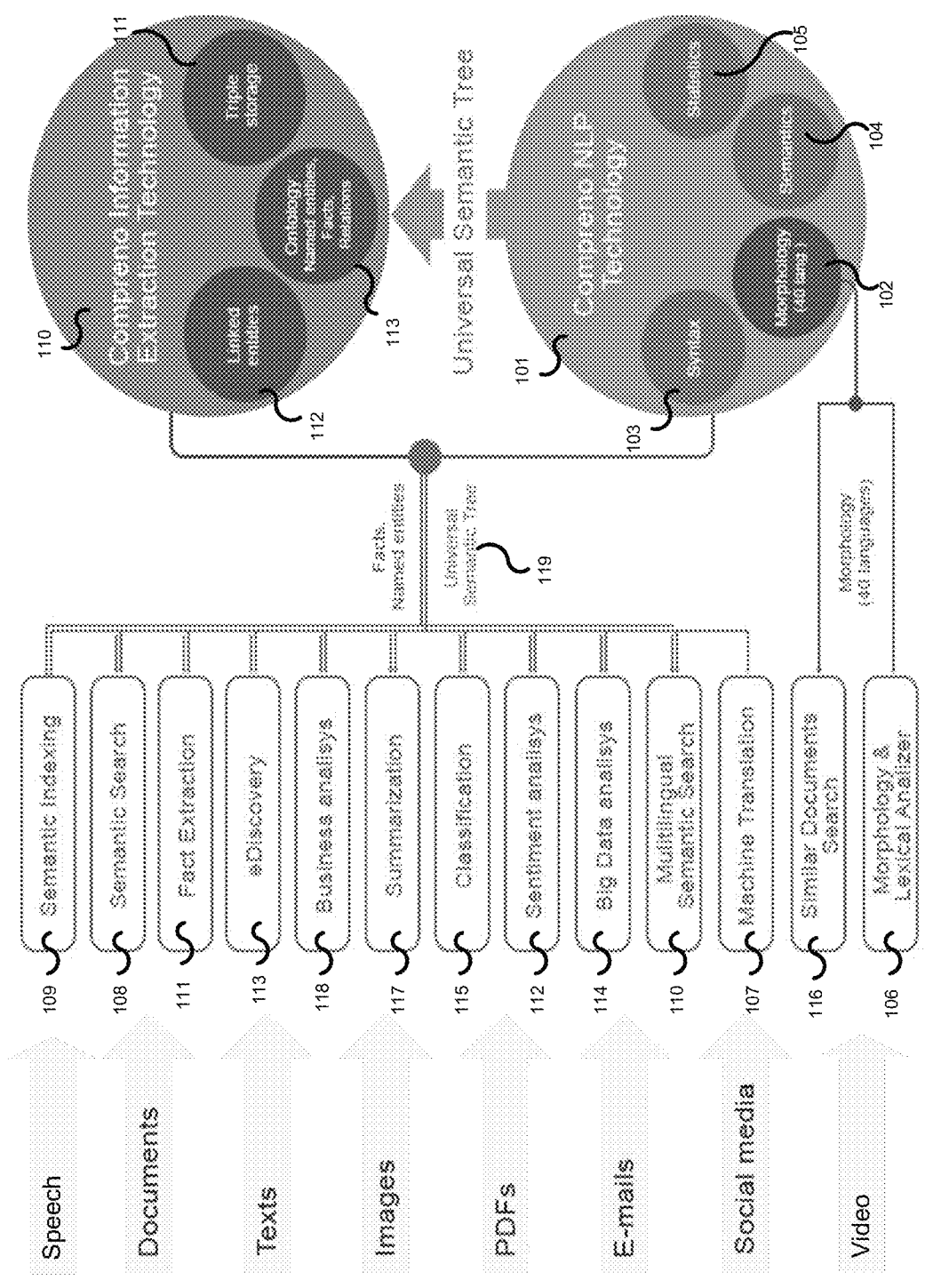
FIG. 1 shows an example environment including processing systems using universal representation of text information according to one or more embodiments.

In the following description, for purposes of explanation, numerous specific details are set forth in order to provide a thorough understanding concepts underlying the described embodiments. It will be apparent, however, to one skilled in the art that the described embodiments can be practiced without some or all of these specific details. In other instances, structures and devices are shown only in block diagram form in order to avoid obscuring the described embodiments. Some process steps have not been described in detail in order to avoid unnecessarily obscuring the underlying concept.

According to various embodiments, systems and methods for processing unstructured information are provided. In particular, these systems and methods provide automatic processing of text information in natural languages. The methods may extract information from natural language texts, seek information in collections of documents, and/or monitor information.

The described systems and methods may provide a universal core independent of the specific language and a lexical content that includes a language-specific lexicon and language models for word formation and word change, as well as syntactic models for coordination and word use in that language. On the other hand, a universal language-independent core includes the exhaustive set of knowledge about the world and ways how the knowledge may be expressed in a language. The knowledge may be represented in the form of hierarchic description of entities of the world, their properties, possible attributes, their relationships, and ways to express it in a language. This type of semantic description may be useful for creating smart natural language processing ("NLP") technologies, especially, applications which can "understand the sense" expressed in natural language, they are necessary to create applications and to solve many natural language processing tasks such as Machine Translation, Semantic Indexing, and Semantic Search, including Multilingual Semantic Search, Fact Extraction, Sentiment Analysis, Similar Document Search, Document Classification, Summarization, Big Data analysis, eDiscovery, Morphology & Lexical Analyzer, and similar applications.

In particular, the disclosed systems and methods may store and operate on text units—words, sentences, texts—in the data base, and also do so with lexical and semantic meanings for the words, sentences, texts and other information units.

The majority of words in any language may have multiple values and express several different concepts. In addition, some word form in a language may correspond to several grammatical values and have multiple base forms (lemmas). For example, "play" in English may designate a noun or a verb and, in addition, match values in various grammatical forms (cases, number, gender, verb forms). This is called grammatical homonymy.

The phenomenon in which the same word has different but similar meanings is called lexical homonymy. These meanings may be similar in concept or completely different. For example, for the verb "play," the Oxford Dictionary provides these meanings: 1) engage in activity for enjoyment and recreation rather than a serious or practical purpose, 2) take part in (a sport), 3) be cooperative, 4) represent (a character) in a theatrical performance or a film, 5) perform on (a musical instrument), 6) move lightly and quickly, so as to appear and disappear; flicker, 7) allow (a fish) to exhaust itself pulling against a line before reeling it in.

In addition, there is semantic homonymy when a word may have totally different meanings. For example, "bank" in English has all sorts of meanings—from "the land alongside or sloping down to a river or lake" to "a financial establishment" or "a stock of something available for use when required."

A person may be able to manually select an appropriate lexical meaning flawlessly from the context, but each of the lexical meanings has its own properties and its own usage model, such as prepositions, objects or limitations on it, and should be translated differently into the other language.

A lexical meaning may be understood to mean one of the meanings (concepts) for the word. A lexical meaning may be expressed in the tools of a certain specific language. It is possible that there may be several words in one language to express the same concept. Close lexical meanings may belong to a single lexical class. An example of such pairs is synonyms. Synonyms may have the same lexical meaning but differ in some grammatical or even semantic attributes. For example, words "конь", "лошадь" and "жеребец" in Russian have the same lexical meaning but differ in a grammatical attribute—gender. At the same time, Russian word "скакун" has a lexical meaning very close to them, but it has several differentiating features that are expressed in an explanatory dictionary as "hardy purebred horse with a lively gait, generally for riding." This type of differentiation may be expressed formally using semantic attributes—semantemes.

Close lexical values are jointed into semantic classes. Thus, Russian words "конь", "лошадь" and "жеребец" with lexical meanings that belong to the same Russian lexical class, and the word "скакун", which does not belong to this Russian lexical class, will belong to the same semantic class HORSE, but each may have its own grammatical and semantic attributes. Analogously, the English words "horse", "foal", "mare" and "stallion" are included in the same semantic class HORSE, with each words having its own grammatical and semantic attributes. There are analogs with terms in German, French, Chinese and other languages.

Any lexical meaning in a specific language may be correlated to a universal, language-independent semantic value—a semantic class plus a set of differentiating semantic and grammatical attributes expressed in universal terms (semantemes). In other words, every word of text may be correlated with a lexical meaning and a semantic meaning. Words in different languages with the same semantic meaning are considered semantic equivalents.

Any thought, concept, notification, any fact or anything said in a language can be expressed using sentences. Every sentence is represented as a sequence of lexical meanings joined by certain relationships, which is expressed in the language as filling the surface (syntactic) slots, and at the semantic level the deep (semantic) slots. For example, in the sentence "The girl eats the apple," the word "apple" fills the slot for Object of the verb "eat", and "girl" fills its surface slot for Subject. The nomenclature for surface slots may be rather broad and differ in different languages. The differences are due to the difference in syntactic models in different languages. At the semantic level, the lexical meaning of "girl" fills the deep slot named "Agens", while the lexical meaning of "apple" fills the deep slot "Object."

The sentence "The apple is eaten by the girl" expresses the same thought, but it has a verb in the Passive Voice, which means that now "girl" fills the slot for Object of the verb "eat", and "apple" fills its surface slot for Subject. Here, at the semantic level, the lexical meaning of "girl" continues to fill the deep slot of Agens, and "apple" the deep pslot of Object. And this is confirmed by the fact that both sentences express the same thought, although they are constructed differently syntactically. In other words, the two sentences have the same semantic meaning.

Unlike the surface slots, the same nomenclature for deep slots may be used in all languages. Thus, the concept of any sentence can also be expressed formally in universal terms using semantic classes, semantemes, and deep slots.

A sentence may contain syntactic ambiguity. It may cause several variants of syntactical parsing. For example, in the sentence "Flying plain may be dangerous" may have at least two meanings: 1) "to fly by plain may be dangerous (for passengers)" 2) "a plane on the wing may represent a danger (maybe for groundlings)". In the first case, the subject is presented by group of words with the gerund "flying" as a core which controls the object "plane". In the second case, the subject is a noun group with a core "plane" and present participle "flying." Often, lexical meaning of a word may be determined only depending on context and a chosen variant of syntactical parsing.

The traditional machine translation systems and information search systems provide for seeking words, but not lexical meanings. The system and method disclosed herein allow operation based on lexical meanings and language-independent semantic meanings. FIG. 2 shows a sequence of actions done by the system at the preliminary stage of technology that provides for production of a universal representation of the information processed from large quantities of documents, data, text corpora, images, and from email servers, social media, recognized speech, video and other sources. If the document is in pdf, image, tif or other non-text format, an OCR or other method may be first used to transform it into a text format.

Figure 2A:
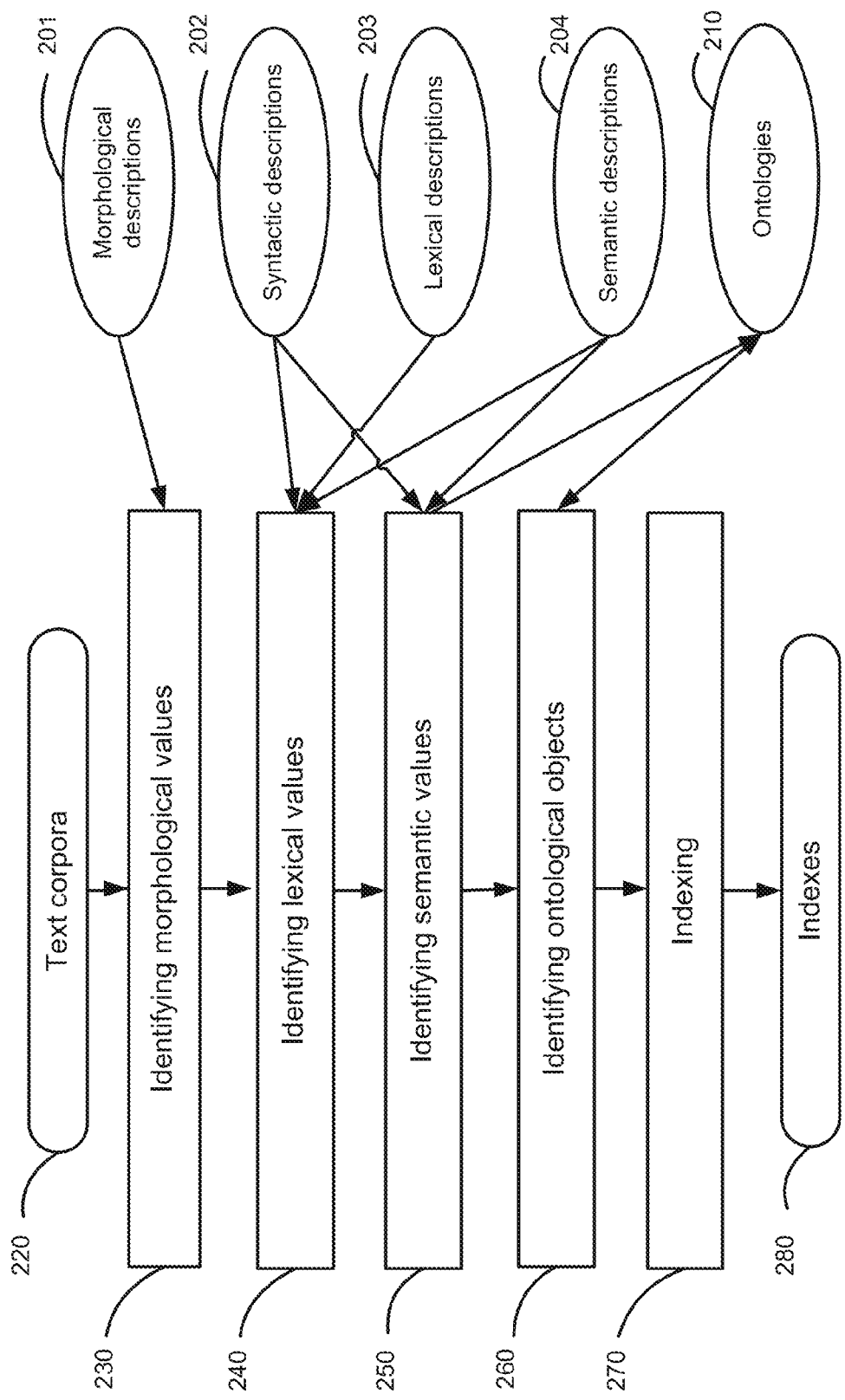
FIG. 2A shows a flow diagram of a method for producing a universal representation of the information to be processed from documents and other sources according to one or more embodiments.
Figure 2B:
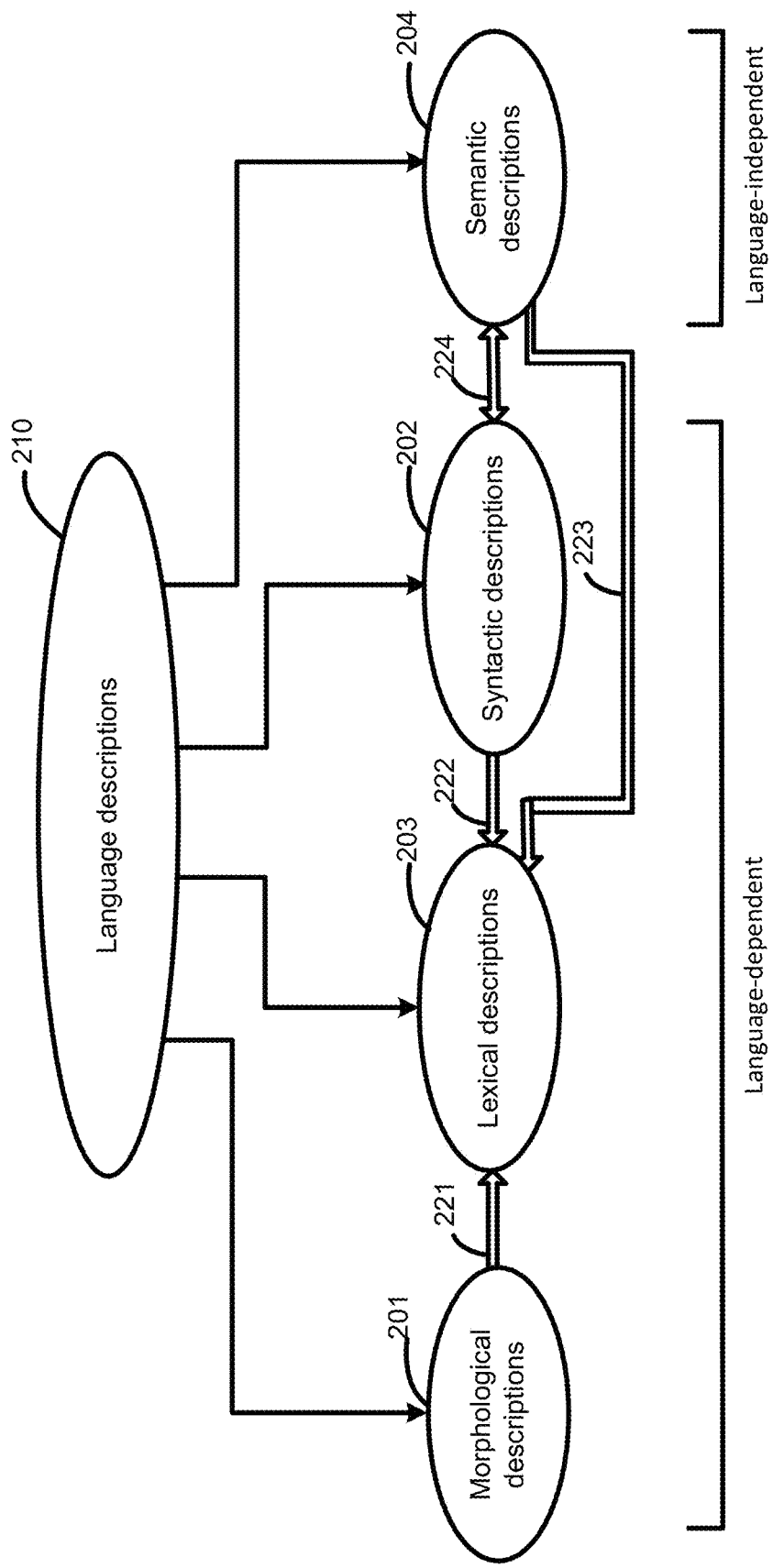
FIG. 2B is a chart illustrating the necessary language descriptions according to one or more embodiments.

Each action indicated is performed on each sentence of the document, text or message from a corpus (220). A "message" as used herein may include any message in social media, forums, emails, any remarks, titles, subtitles and other types of textual information from video, inscriptions etc. In case, when images, pdf or other files which are required to be recognized are processed, an additional step of preliminary conversion into text format is added. At these steps any known industrial systems, such as, for example, FineReader, may be used. In case of speech or audio files are processed, another preliminary step of speech recognition is added. At all stages presented on FIG. 2A of the method described, there is wide use of a broad spectrum of linguistic descriptions. The necessary linguistic descriptions are shown in FIG. 2B and include at least the morphological descriptions (201), syntactic descriptions (202), lexical descriptions (203), and semantic descriptions (204).

At stage 230, the morphological values of the words of the sentence are identified. In other words, a sentence is broken down into lexical elements and their potential lemmas (initial or base forms) and the corresponding variants of the grammatical values are identified. Generally a set of variants is identified for each element; because of homonymy and coincidence of word forms in various grammatical values. A schematic example of the result of stage 230 for the sentence "This boy is smart, he'll succeed in life" is depicted in FIG. 2C.

At stage 240, the lexical meanings of the elements of the sentence are identified. The majority of natural language processing systems are based on a statistical approach, and generally either the most frequent lexical meaning or the lexical meaning selected based on results of preliminary machine learning on text corpora given the context is chosen as the most probable. The lexical selection using the method disclosed herein is performed taking into account many factors including, but not limited to, the applicability of syntactic models for each of the possible lexical meanings in the sentence in question, the pragmatic characteristics of each lexical meaning, the pragmatic characteristics of the context, the field of the text and the corpus in general, and a priori and statistical ratings, both for the lexical meanings themselves and for the surface and deep slots.

In a general case, at stage 240, a syntactic analysis precedes the lexical selection. This includes activation of syntactic models of one or more potential lexical meanings for the word being examined and establishment of all potential surface links in the sentence, which is expressed in the construction of a data structure called a graph of generalized constituents. Then at least one data structure that represents a tree-like syntactic structure for the sentence is generated from the graph of generalized constituents. The necessary non-tree links are also established. This process is described in U.S. patent application Ser. No. 11/548,214 that was filed on 10 Oct. 2006, now U.S. Pat. No. 8,078,450, which is incorporated herein by reference in its entirety. In the general case, several such structures are generated; this is particularly due to existing set of variants for lexical selection. Each of variant of syntactic structure has its own rating; the structures are ordered from the most probable to the less probable.

As an option, a conditional probability lexical selection is possible where various hypotheses about lexical meanings can be examined, then a probability is assigned to each hypothesis and these multiple variations will be transferred in parallel to the next stage.

At stage 250, the semantic meanings of the elements of the sentence are identified. Each lexical meaning is assigned a semantic class plus a set of semantic and differential lexical and grammatical attributes. A data structure called a semantic structure may be constructed based on each syntactic structure in the sentence. In one embodiment, at first the semantic structure is built for the best (with a higher integral fating). The semantic structure of the sentence is generally a graph structure with a separate vertex; this structure has semantic values in its nodes and the branches represent the deep semantic relationships.

In some embodiments, for creating separate applications, such as, for example, Morphology & Lexical Analyzer, the stage 260 may be optional. At this stage, if there is an ontology described (210) that is relevant to a given field of text, facts and entities represented in the text are identified and linked with the corresponding concept of the ontology. A possible side effect of this process may be the actual filling of the ontologies with new facts and entities.

At stage 270, the lexical and semantic meanings are indexed. One can use any type of indexing including a direct index or an inverted one. For example, when an inverted index is constructed, each indexed element will be associated with a list of addresses where it occurs in the text. Analogously, the syntactic and semantic structures (senses) may be also indexed. As an option, the ontology objects (e.g., facts, entities, etc.) are indexed.

At all stages of the method described, there is wide use of a broad spectrum of linguistic descriptions. A description of a set of the mentioned linguistic descriptions and details of the individual stages of the method is shown below. FIG. 2B is a chart illustrating the necessary language descriptions (210) according to one embodiment. Language descriptions (210) include morphological descriptions (201), syntactic descriptions (202), lexical descriptions (203) and semantic descriptions (204).

FIG. 2B illustrates language descriptions 210 including the morphological descriptions 201, the lexical descriptions 203, the syntactic descriptions 202, and the semantic descriptions 204, and their relationship thereof. Among them, the morphological descriptions 201, the lexical descriptions 203, and the syntactic descriptions 202 are language-specific. Each of these language descriptions 210 can be created for each source language, and taken together, they represent a model of the source language. The semantic descriptions 204, however, are language-independent and are used to describe language-independent semantic features of various languages and to construct language-independent semantic structures.

As shown in FIG. 2B, the morphological descriptions 201, the lexical descriptions 203, the syntactic descriptions 202, and the semantic descriptions 204 are related. Lexical descriptions 204 and morphological descriptions 201 are related by a link 221 because a specified lexical meaning in the lexical description 230 may have a morphological model represented as one or more grammatical values for the specified lexical meaning. For example, one or more grammatical values can be represented by different sets of grammemes in a grammatical system of the morphological descriptions 101.

In addition, as shown by a link 222, a given lexical meaning in the lexical descriptions 203 may also have one or more surface models corresponding to the syntactic descriptions 202 for the given lexical meaning. As represented by a link 223, the lexical descriptions 203 can be connected with the semantic descriptions 204. Therefore, the lexical descriptions 203 and the semantic descriptions 204 may be combined into "lexical-semantic descriptions", such as a lexical-semantic dictionary.

As shown by a link 224, the syntactic descriptions 240 and the semantic descriptions 204 are related. For examples, diatheses 417 of the syntactic descriptions 202 can be considered as the "interface" between the language-specific surface models and the language-independent deep models 512 of the semantic description 204.

Figure 3:
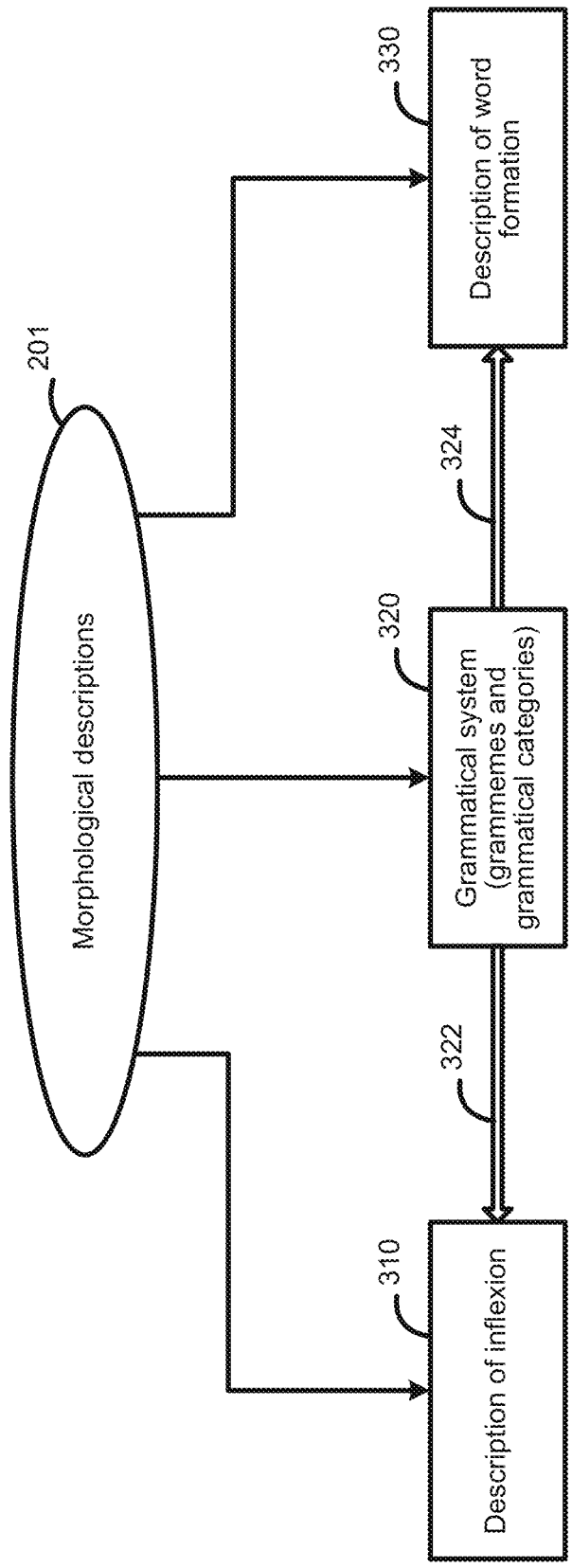
FIG. 3 illustrates exemplary morphological descriptions according to one or more embodiments.

FIG. 3 illustrates exemplary morphological descriptions. The components of the morphological descriptions 201 include, but are not limited to, word-inflexion description 310, grammatical system 320 (e.g., grammemes), and word-formation description 330, among others. The grammatical system 320 is a set of grammatical categories, such as, "Part of speech", "Case", "Gender", "Number", "Person", "Reflexivity", "Tense", "Aspect", etc., and their meanings, hereafter referred to as "grammemes", including, for example, Adjective, Noun, Verb, etc.; Nominative, Accusative, Genitive, etc.; Feminine, Masculine, Neuter, etc.; and others.

The word-inflexion description 310 describes how the main word form may change according to its case, gender, number, tense, etc. and broadly includes or describes all possible forms for this word. The word-formation 330 describes which new words may be generated involving this word (for example, there are a lot of compound words in German). The grammemes are units of the grammatical systems 320 and, as shown by a link 222 and a link 324 in FIG. 3, the grammemes can be utilized to build the word-inflexion description 310 and the word-formation description 330.

According to one embodiment, when establishing syntactic relationships for elements of the source sentence, constituent models are used. A constituent may include a contiguous group of words in a sentence and behaves as one entity. A constituent has a word at its core and can include child constituents at lower levels. A child constituent is a dependent constituent and may be attached to other constituents (as parent constituents) for building the syntactic descriptions 202 of the source sentence.

Figure 4:
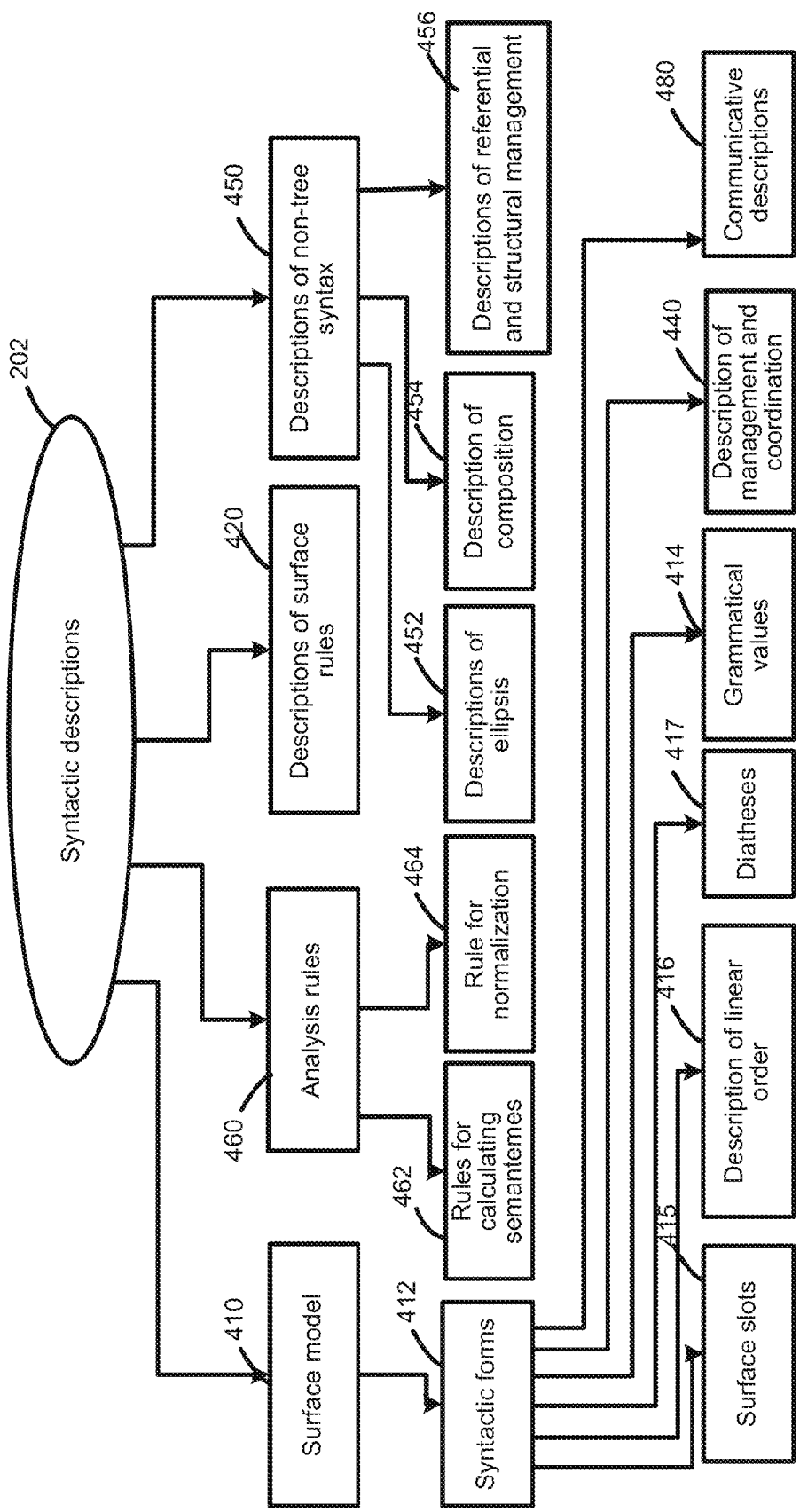
FIG. 4 illustrates exemplary syntactical descriptions according to one or more embodiments.

FIG. 4 illustrates exemplary syntactic descriptions. The components of the syntactic descriptions 202 may include, but are not limited to, surface models 410, surface slot descriptions 420, referential and structural control description 430, government and agreement description 440, non-tree syntax description 450, and analysis rules 460. The syntactic descriptions 202 are used to construct possible syntactic structures of a source sentence from a given source language, taking into account free linear word order, non-tree syntactic phenomena (e.g., coordination, ellipsis, etc.), referential relationships, and other considerations.

The surface models 410 are represented as aggregates of one or more syntactic forms ("syntforms" 412) in order to describe possible syntactic structures of sentences as included in the syntactic description 202. In general, the lexical meaning of a language is linked to their surface (syntactic) models 410, which represent constituents which are possible when the lexical meaning functions as a "core" and includes a set of surface slots of child elements, a description of the linear order, diatheses, among others.

The surface models 410 as represented by syntactic forms 412. Each syntactic form 412 may include a certain lexical meaning which functions as a "core" and may further include a set of surface slots 415 of its child constituents, a linear order description 416, diatheses 417, grammatical values 414, government and agreement descriptions 440, communicative descriptions 480, among others, in relationship to the core of the constituent.

The surface slot descriptions 420 as a part of syntactic descriptions 202 are used to describe the general properties of the surface slots 415 that used in the surface models 410 of various lexical meanings in the source language. The surface slots 415 are used to express syntactic relationships between the constituents of the sentence. Examples of the surface slot 415 may include "subject", "object_direct", "object_indirect", "relative clause", among others.

Figure 5:
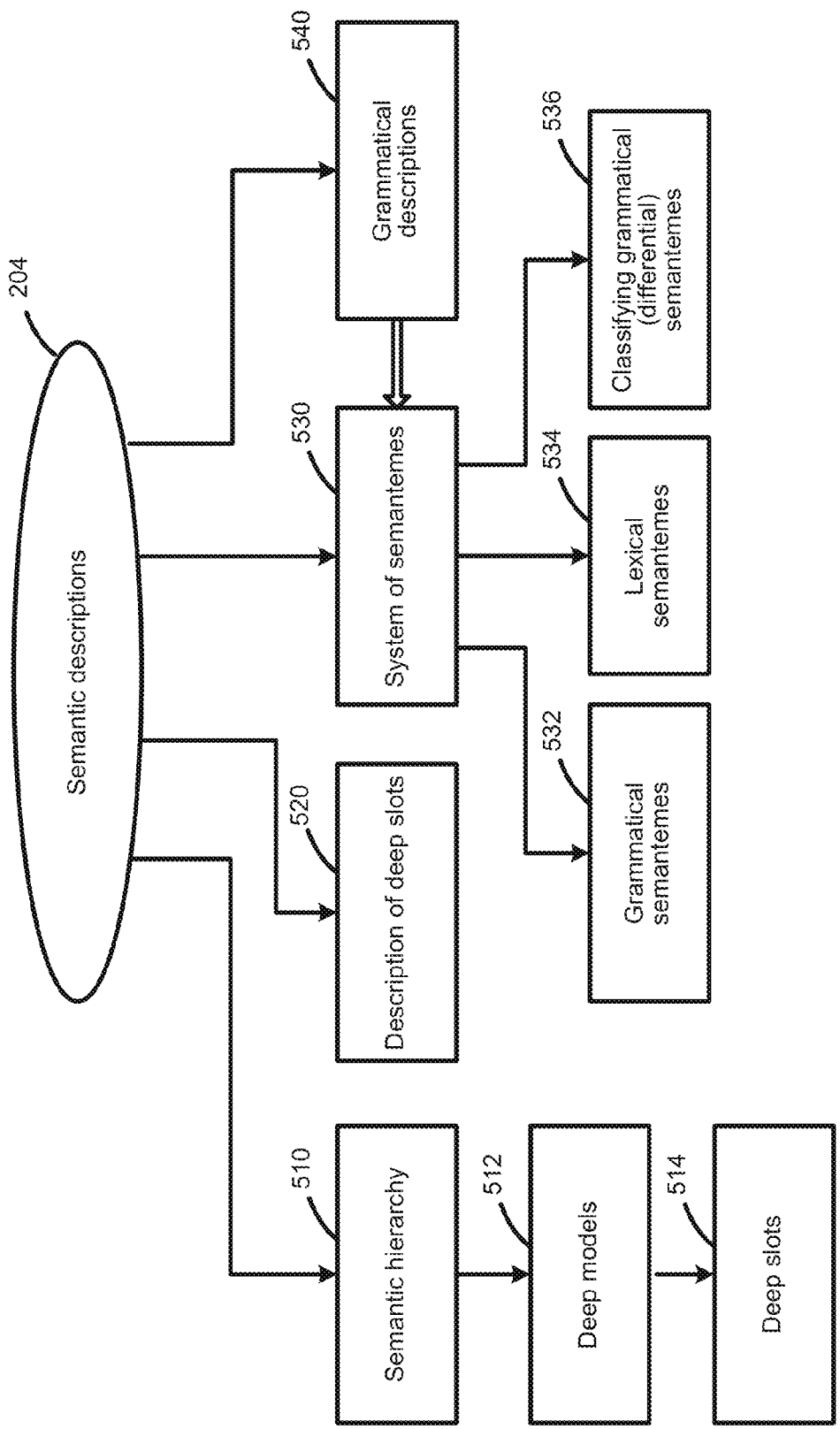
FIG. 5 illustrates exemplary semantic descriptions according to one or more embodiments.

During the syntactic analysis, the constituent model utilizes a plurality of the surface slots 415 of the child constituents and their linear order descriptions 416 and describes the grammatical values 414 of the possible fillers of these surface slots 415. The diatheses 417 represent correspondences between the surface slots 415 and deep slots 514 (as shown in FIG. 5). The diatheses 417 are represented by the link 224 between syntactic descriptions 202 and semantic descriptions 204. The communicative descriptions 480 describe communicative order in a sentence.

The syntactic forms, syntactic forms 412, are a set of the surface slots 415 coupled with the linear order descriptions 416. One or more constituents possible for a lexical meaning of a word form of a source sentence may be represented by surface syntactic models, such as the surface models 410. Every constituent is viewed as the realization of the constituent model by means of selecting a corresponding syntactic form 412. The selected syntactic forms, the syntactic forms 412, are sets of the surface slots 415 with a specified linear order. Every surface slot in a syntactic form can have grammatical and semantic restrictions on their fillers.

The linear order description 416 is represented as linear order expressions, which are built to express a sequence in which various surface slots 415 can occur in the sentence. The linear order expressions may include names of variables, names of surface slots, parenthesis, grammemes, ratings, and the "or" operator, etc. For example, a linear order description for a simple sentence of "Boys play football." may be represented as "Subject Core Object_Direct", where "Subject", "Object_Direct" are names of surface slots 415 corresponding to the word order. Fillers of the surface slots 415 indicated by symbols of entities of the sentence are present in the same order for the entities in the linear order expressions.

Different surface slots 415 may be in a strict and/or variable relationship in the syntactic form 412. For example, parenthesis may be used to build the linear order expressions and describe strict linear order relationships between different surface slots 415. SurfaceSlot1 SurfaceSlot2 or (SurfaceSlot1 SurfaceSlot2) means that both surface slots are located in the same linear order expression, but only one order of these surface slots relative to each other is possible such that SurfaceSlot2 follows after SurfaceSlot1.

As another example, square brackets may be used to build the linear order expressions and describe variable linear order relationships between different surface slots 415 of the syntactic form 412. As such, [SurfaceSlot1 SurfaceSlot2] indicates that both surface slots belong to the same variable of the linear order and their order relative to each other is not relevant.

The linear order expressions of the linear order description 416 may contain grammatical values 414, expressed by grammemes, to which child constituents correspond. In addition, two linear order expressions can be joined by the operator I (<<OR>>). For example: (Subject Core Object)|[Subject Core Object].

The communicative descriptions 480 describe a word order in the syntactic form 412 from the point of view of communicative acts to be represented as communicative order expressions, which are similar to linear order expressions. The government and agreement description 440 contains rules and restrictions on grammatical values of attached constituents which are used during syntactic analysis.

The non-tree syntax descriptions 450 are related to processing various linguistic phenomena, such as, ellipsis and coordination, and are used in syntactic structures transformations which are generated during various steps of analysis according to embodiments of the invention. The non-tree syntax descriptions 450 include ellipsis description 452, coordination description 454, as well as, referential and structural control description 430, among others.

The analysis rules 460 as a part of the syntactic descriptions 202 may include, but not limited to, semantemes calculating rules 462 and normalization rules 464. Although analysis rules 460 are used during the step of semantic analysis, the analysis rules 460 describe properties of a specific language and are related to the syntactic descriptions 202. The normalization rules 464 are used as transformational rules to describe transformations of semantic structures which may be different in various languages.

FIG. 5 illustrates exemplary semantic descriptions. The components of the semantic descriptions 204 are language-independent and may include, but are not limited to, a semantic hierarchy 510, deep slots descriptions 520, a system of semantemes 530, and pragmatic descriptions 540.

The semantic hierarchy 510 are comprised of semantic notions (semantic entities) and named semantic classes arranged into hierarchical parent-child relationships similar to a tree. A child semantic class inherits most properties of its direct parent and all ancestral semantic classes. For example, semantic class SUBSTANCE is a child of semantic class ENTITY and the parent of semantic classes GAS, LIQUID, METAL, WOOD_MATERIAL, etc.

Each semantic class in the semantic hierarchy 510 is supplied with a deep model 512. The deep model 512 of the semantic class is a set of the deep slots 514, which reflect the semantic roles of child constituents in various sentences with objects of the semantic class as the core of a parent constituent and the possible semantic classes as fillers of deep slots. The deep slots 514 express semantic relationships, including, for example, "agent", "addressee", "instrument", "quantity", etc. A child semantic class inherits and adjusts the deep model 512 of its direct parent semantic class The deep slots descriptions 520 are used to describe general properties of the deep slots 514 and reflect the semantic roles of child constituents in the deep models 512. The deep slots descriptions 520 also contain grammatical and semantic restrictions of the fillers of the deep slots 514. The properties and restrictions for the deep slots 514 and their possible fillers are very similar and often times identical among different languages. Thus, the deep slots 514 are language-independent.

The system of semantemes 530 represents a set of semantic categories and semantemes, which represent the meanings of the semantic categories. As an example, a semantic category, "DegreeOfComparison", can be used to describe the degree of comparison and its semantemes may be, for example, "Positive", "ComparativeHigherDegree", "SuperlativeHighestDegree", among others. As another example, a semantic category, "RelationToReferencePoint", can be used to describe an order as before or after a reference point and its semantemes may be, "Previous", "Subsequent", respectively, and the order may be spatial or temporal in a broad sense of the words being analyzed. As yet another example, a semantic category, "EvaluationObjective", can be used to describe an objective assessment, such as "Bad", "Good", etc.

The systems of semantemes 530 include language-independent semantic attributes which express not only semantic characteristics but also stylistic, pragmatic and communicative characteristics. Some semantemes can be used to express an atomic meaning which finds a regular grammatical and/or lexical expression in a language. By their purpose and usage, the system of semantemes 530 may be divided into various kinds, including, but not limited to, grammatical semantemes 532, lexical semantemes 534, and classifying grammatical (differentiating) semantemes 536.

The grammatical semantemes 532 are used to describe grammatical properties of constituents when transforming a syntactic tree into a semantic structure. The lexical semantemes 534 describe specific properties of objects (for example, "being flat" or "being liquid") and are used in the deep slot descriptions 520 as restriction for deep slot fillers (for example, for the verbs "face (with)" and "flood", respectively). The classifying grammatical (differentiating) semantemes 536 express the differentiating properties of objects within a single semantic class, for example, in the semantic class HAIRDRESSER the semanteme <<RelatedToMen>> is assigned to the lexical meaning "barber", unlike other lexical meanings which also belong to this class, such as "hairdresser", "hairstylist", etc.

The pragmatic description 540 allows the system to assign a corresponding theme, style or genre to texts and objects of the semantic hierarchy 510. For example, "Economic Policy", "Foreign Policy", "Justice", "Legislation", "Trade", "Finance", etc. Pragmatic properties can also be expressed by semantemes. For example, pragmatic context may be taken into consideration during the semantic analysis.

Figure 6:
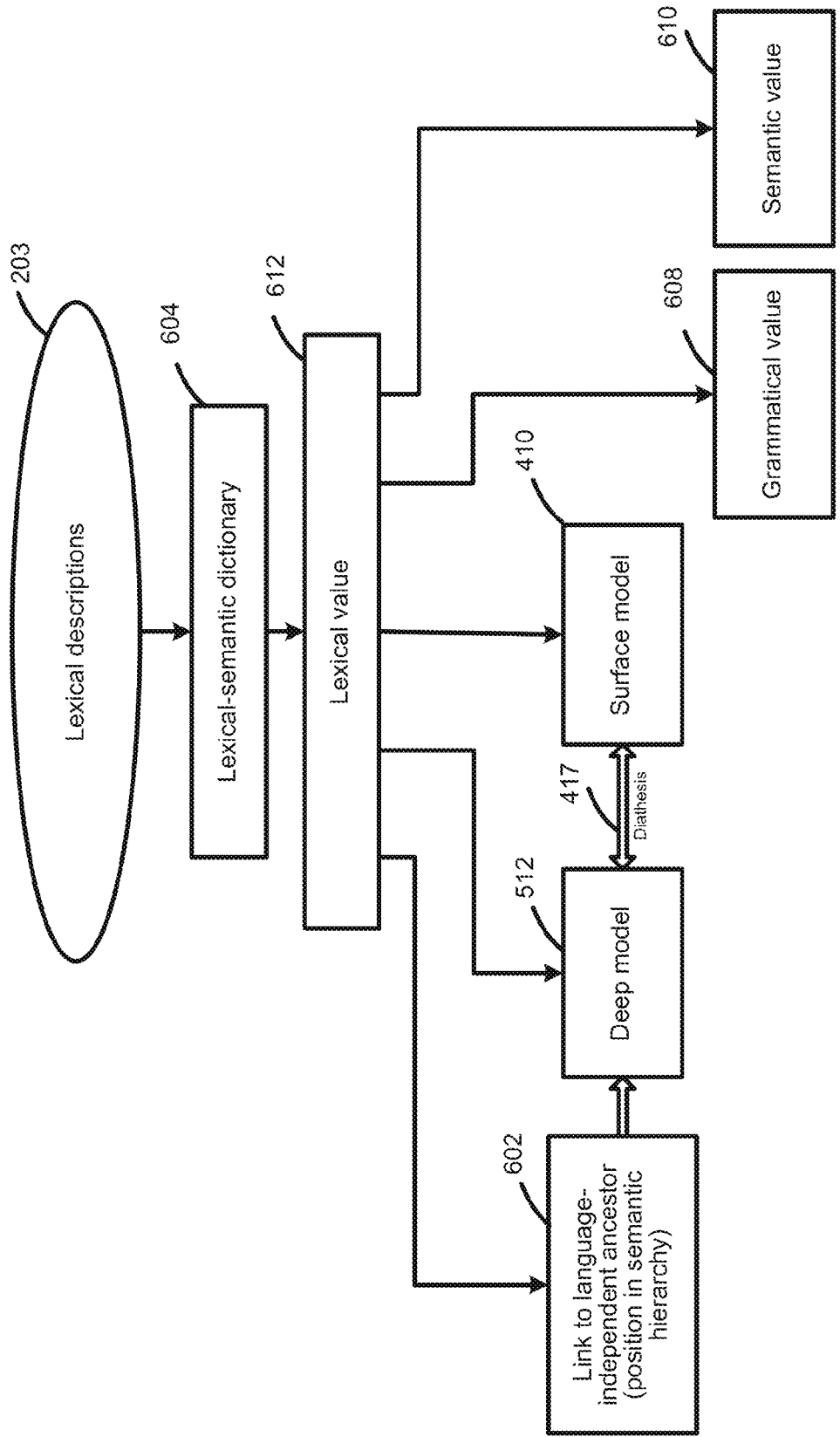
FIG. 6 illustrates exemplary lexical descriptions according to one or more embodiments.

FIG. 6 illustrates exemplary lexical descriptions. The lexical descriptions 203 represent a plurality of lexical meanings 612 in a specific language for each component of a sentence. For each lexical meaning 612, a link 602 to its language-independent semantic parent may be established to indicate the location of a given lexical meaning in the semantic hierarchy 510.

Each lexical meaning 612 is connected with its deep model 512, which is described in language-independent terms, and surface model 410, which is language-specific. Diatheses can be used as the "interface" between the surface models 410 and the deep models 512 for each lexical meaning 612. One or more diatheses 417 can be assigned to each surface slot 415 in each syntform 412 of the surface models 410.

While the surface model 410 describes the syntactic roles of surface slot fillers, the deep model 512 generally describes their semantic roles. A deep slot description 520 expresses the semantic type of a possible filler, reflects the real-world aspects of the situations, the properties or attributes of the objects denoted by words of any natural language. Each deep slot description 520 is language-independent since different languages use the same deep slot to describe similar semantic relationships or express similar aspects of the situations, and the fillers of the deep slots 514 generally have the same semantic properties even in different languages. Each lexical meaning 612 of a lexical description of a language inherits semantic class from its parent and adjusts its deep model 512.

In addition, the lexical meanings 612 may contain their own characteristics and also inherit other characteristics from language-independent parent semantic class as well. These characteristics of the lexical meanings 612 include grammatical values 608, which can be expressed as grammemes, and semantic value 610, which can be expressed as sememtemes.

Every surface model 410 of a lexical meaning includes one or more syntactic forms 412. Every syntactic form 412 of a surface model 410 may include one or more surface slots 415 with their linear order description 416, one or more grammatical values 414 expressed as a set of grammatical characteristics (grammemes), one or more semantic restrictions on surface slot fillers, and one or more of the diatheses 417. Semantic restrictions on a surface slot filler are a set of semantic classes, whose objects can fill this surface slot. The diatheses 417 are the part of relationship 224 between syntactic descriptions 202 and semantic descriptions 204, and represent correspondences between the surface slots 415 and the deep slots 514 of the deep model 512.

Figure 7A:
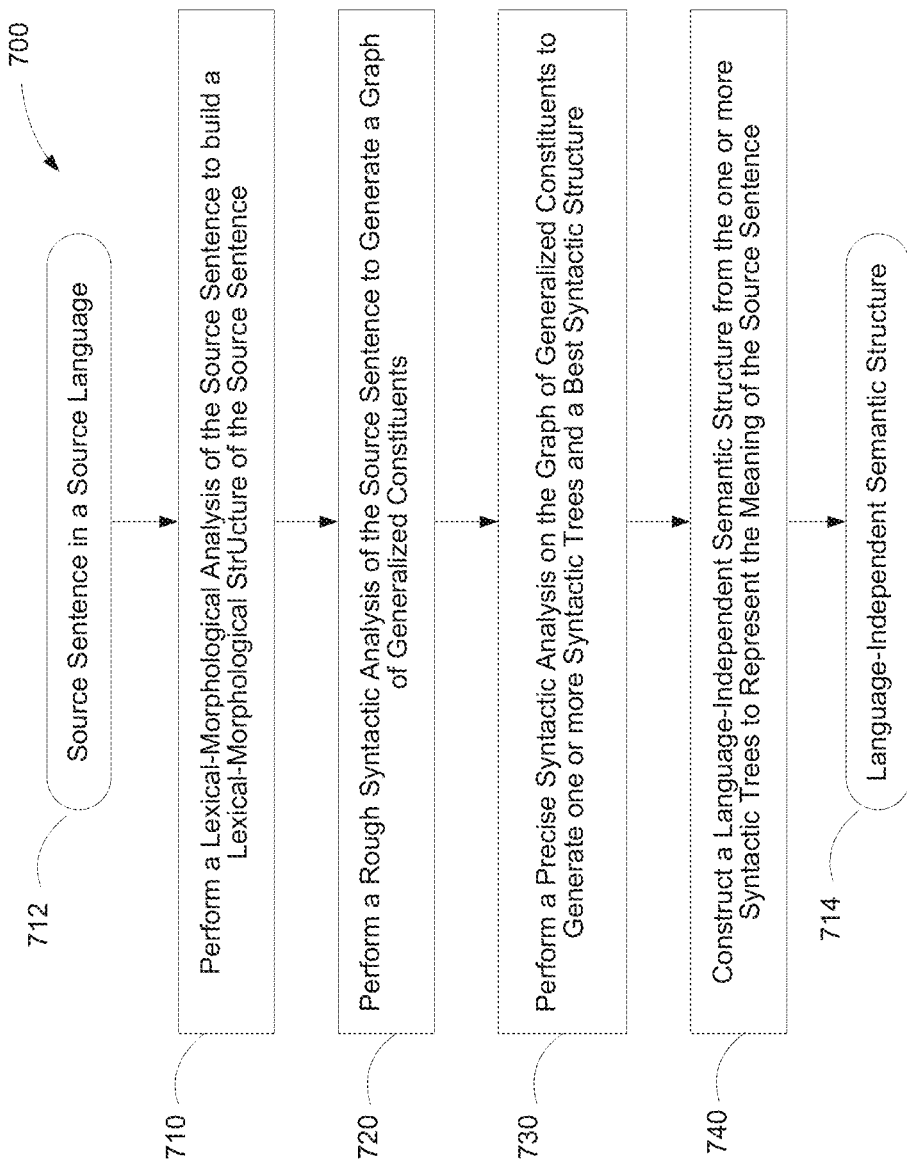
FIG. 7A illustrates semantic-syntactic analysis according to one or more embodiments.
Figure 7B:
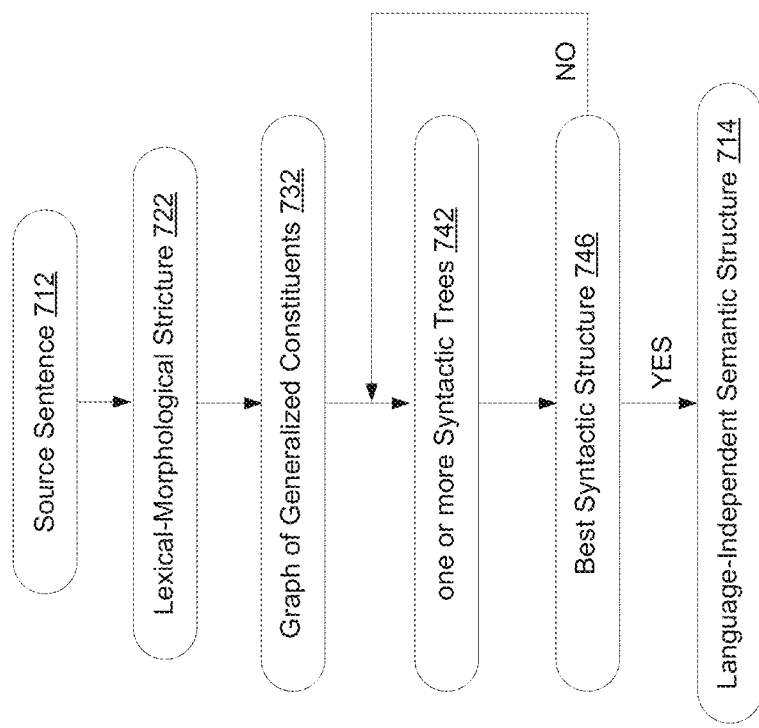
FIG. 7B shows the sequence of data structures built during the process of analyzing according to one or more embodiments.

Returning to FIG. 2A, stage 240 consists of the fact that for determination of the lexical meanings, every sentence in the source language undergoes parsing in accordance with the technology for exhaustive semantic-syntactic analysis described in detail in U.S. Pat. No. 8,078,450 incorporated herein by reference. This technology uses all the linguistic descriptions (210) described, including morphological descriptions (201), lexical descriptions (203), syntactic descriptions (202), and semantic descriptions (204). FIG. 7A illustrates the steps of this method. FIG. 7B shows the sequence of data structures built into the process of analyzing.

Preliminarily, at stage 710, the source sentence of the source language is subjected to Lexical-Morphological Analysis to build a Lexical-Morphological Structure (722) of the Source Sentence. The Lexical-Morphological Structure (722) is a set of all possible pairs of "lexical meaning—grammatical meaning" for each lexical element (word) in the sentence. An example of such a structure is shown in FIG. 2C.

Then the first stage of syntactic analysis is done in the Lexical-Morphological Structure—Rough Syntactic Analysis (720) of the Source Sentence to Generate a Graph of Generalized Constituents (732). During Rough Syntactic Analysis (720), for each element of the Lexical-Morphological Structure (722), all the possible syntactic models for this lexical value are applied and checked to find all the potential syntactic links in the sentence, which is expressed in the graph of generalized constituents (732).

The graph of generalized constituents (732) is an acyclic graph in which the nodes are generalized (meaning that they store all the variants) lexical meanings for words in the sentence, and the branches are surface (syntactic) slots expressing various types of relationships between the combined lexical meanings. All possible surface syntactic models are used for each element of the lexical-morphological structure of the sentence as a potential core for the constituents. Then all the possible constituents are prepared and generalized into a graph of generalized constituents (732). Correspondingly, all the possible syntactic models and syntactic structures for the source sentence (712) are examined and a graph of generalized constituents (732) based on a set of generalized constituents is constructed as a result. The graph of generalized constituents (732) at the surface model level reflects all the potential links between words of the source sentence 713). Because the number of variations of a syntactic breakdown can be large in the general case, the graph of generalized constituents (732) is excessive and has a great number of variations—both for selecting the lexical meaning for the vertex and for the surface slots for the graph branches.

For each "lexical value—grammatical value" pair, its surface model is initialized, other constituents are added in the surface slots (415) of the syntform (syntactic form) (412) of its surface model (410) and the neighboring constituents on the left and on the right. The syntactic descriptions are shown in FIG. 4. If an appropriate syntactic form is found in the surface model (410) for the corresponding lexical meaning, the selected lexical meaning may serve as the core for a new constituent.

The graph of generalized constituents (732) is initially constructed as a tree, starting from the leaves and continuing to the root (bottom to top). Additional constituents are produced from bottom to top by adding child constituents to parent constituents by filling surface slots (415) of the parent constituents in order to cover all the initial lexical units of the source sentence (712).

Figure 7C:
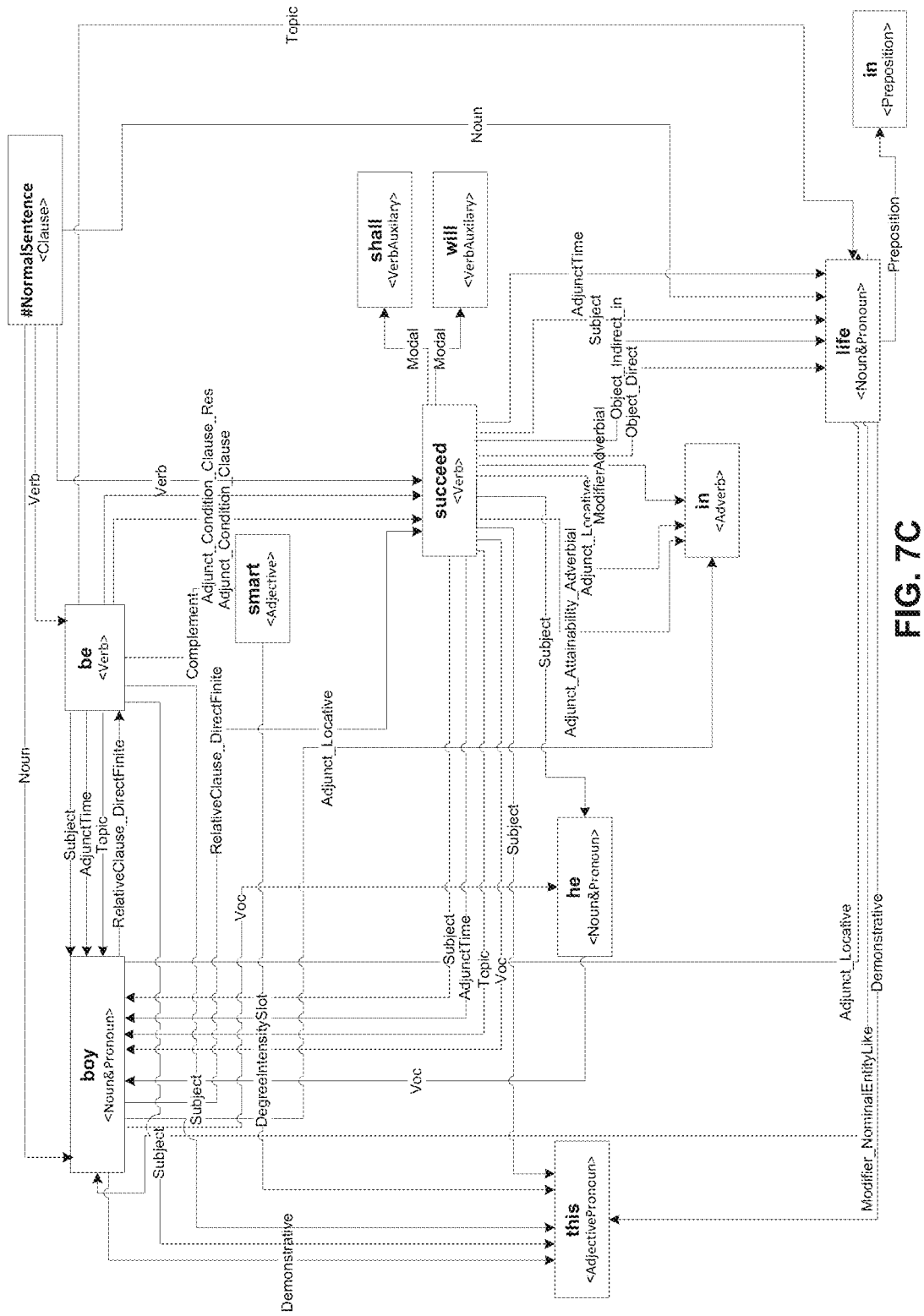
FIG. 7C shows a schematic example of a graph of generalized constituents for a sentence previously mentioned, "This boy is smart, he'll succeed in life." according to one or more embodiments.

The root of the tree, which is the main vertex of graph 732, generally constitutes the predicate (what was said). During this process, the tree usually becomes a graph because the lower-level constituents (leaves) may be included in multiple higher-level constituents (root). Several constituents constructed for the same constituents of the lexical-morphological structure may later be generalized to produce generalized constituents. Constituents are generalized based on lexical values or grammatical values (414), such as those based on parts of speech and the relationships between them. FIG. 7C shows a schematic example of a graph of generalized constituents for a sentence previously mentioned: "This boy is smart, he'll succeed in life."

Figure 8A:
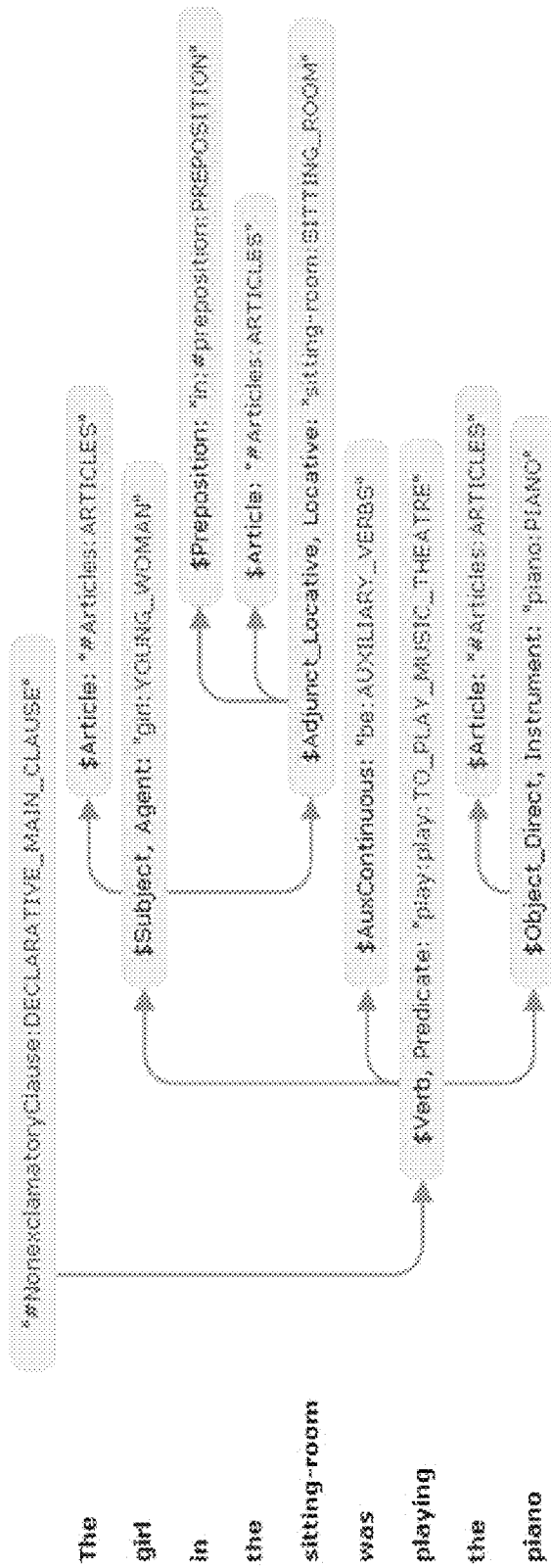
FIGS. 8A-8B show syntactic trees for the English sentence "The girl in the sitting-room was playing the piano." according to one or more embodiments.
Figure 8B:
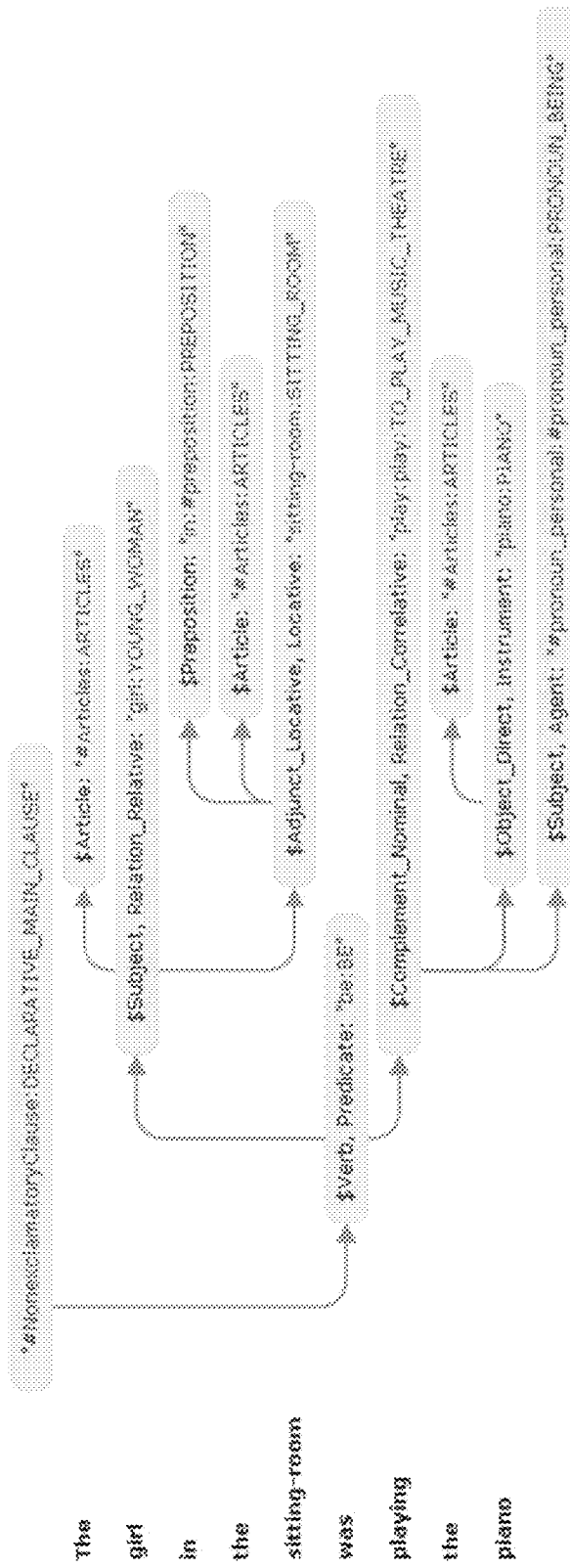

Precise syntactic analysis (730) is done to separate the syntactic tree (742) from the graph of generalized constituents (732). One or more syntactic trees are constructed and for each of them, a total rating is computed based on the use of a set of a priori and computed ratings, and the tree with the best rating is selected to construct the best syntactic structure (746) for the source sentence. FIG. 8 and FIG. 8A show two different possible syntactic trees for the English sentence "The girl in the sitting-room was playing the piano."

The syntactic trees are generated as a process of advancing and checking hypotheses about a possible syntactic structure for a sentence, wherein hypotheses about the structure of parts of the sentence are generated as part of the hypothesis about the structure of the entire sentence.

During the process of transitioning from the syntactic tree selected to the syntactic structure (746), non-tree links are set up. If non-tree links could not be set up, then the syntactic tree having the next highest rating is selected and an attempt is made to set up non-tree links on it. The result of precise analysis (730) is a better syntactic structure (746) for the sentence analyzed. In fact, as a result of selecting the best syntactic structure (746), a lexical selection is also made, i.e. determination (240) of the lexical meanings of the elements of the sentence (FIG. 2A).

Figure 9:
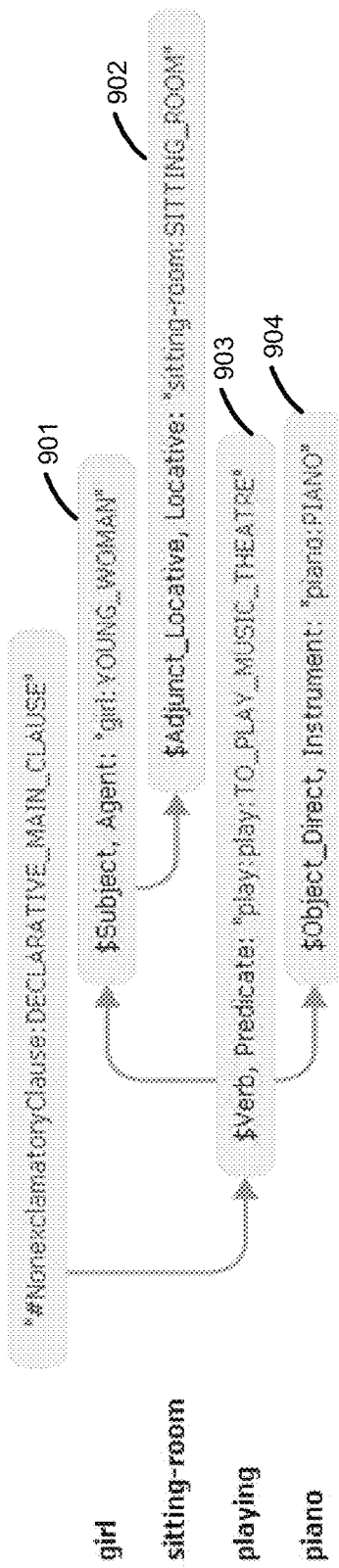
FIG. 9 shows semantic structure for the English sentence "The girl in the sitting-room was playing the piano." according to one or more embodiments.
Figure 10:
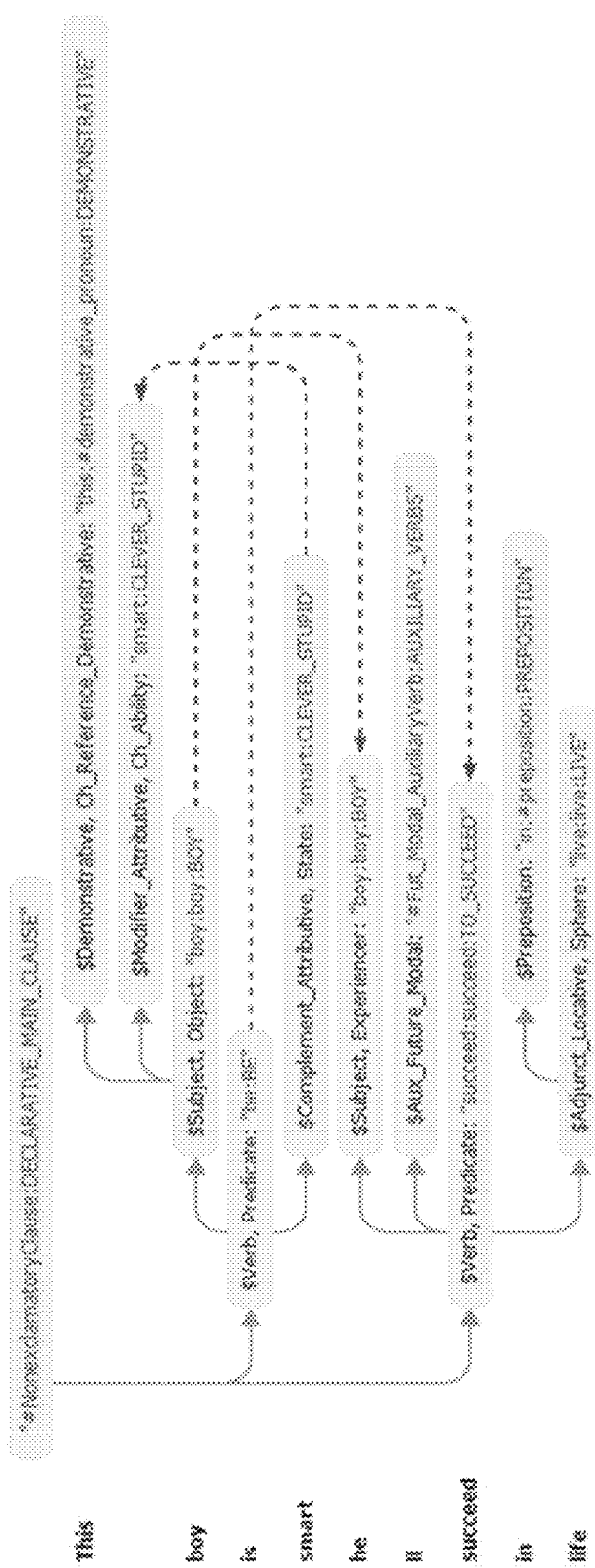
FIG. 10 shows a better syntactic structure of the English sentence "This boy is smart, he'll succeed in life." according to one or more embodiments.
Figure 11:
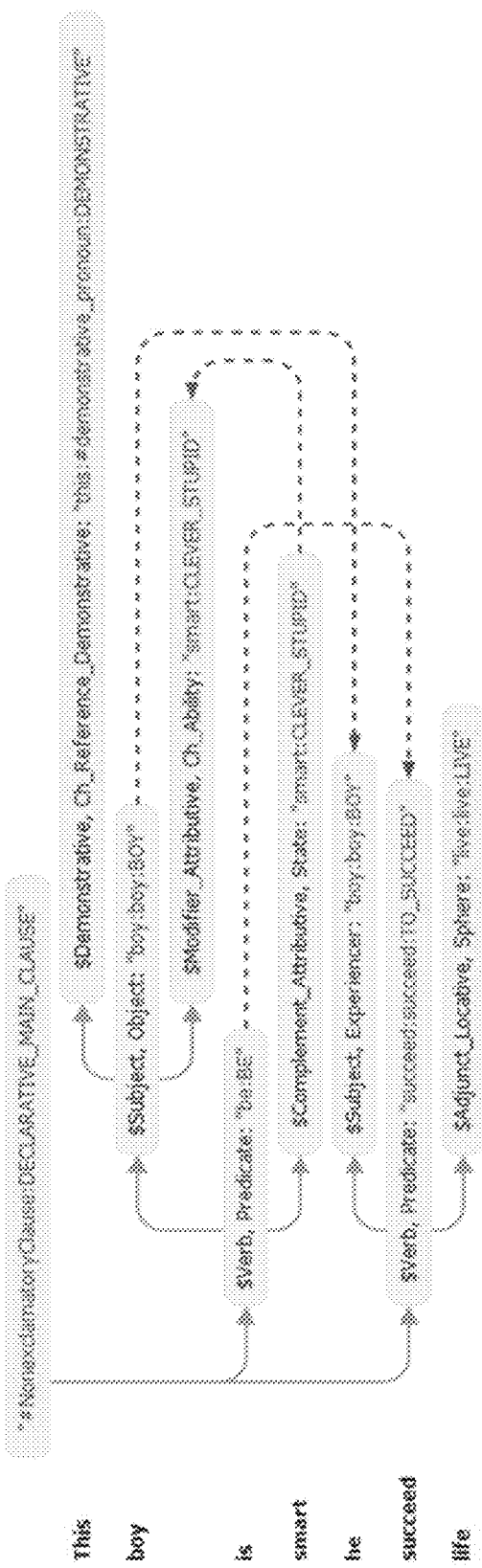
FIG. 11 shows a semantic structure of the English sentence "This boy is smart, he'll succeed in life." according to one or more embodiments.

At stage (740), there is a transition to a language-independent semantic structure (714), which reflects the sense of the sentence in universal language-independent concepts. The language-independent semantic structure of the sentence is represented as an acyclic graph (trees, supplemented by non-tree links) where each word of a specific language is replaced with universal (language-independent) semantic entities called semantic classes here. The transition is done using semantic descriptions (204) and analysis rules (460), resulting in a structure in graph form with a main vertex, in which the nodes are semantic classes supplied with a set of attributes (the attributes express the lexical, syntactic and semantic properties of specific words of the source sentence), and the branches represent the deep (semantic) relationships between the words (nodes) that they join. FIG. 9 shows the semantic structure for the English sentence "The girl in the sitting-room was playing the piano." This drawing does not show the semantic or other attributes. The construction of the semantic structure is ended by stage 250, identification of the semantic meanings (FIG. 2A). The other drawings show some more examples of structures. FIG. 10 shows a better syntactic structure of the English sentence mentioned, "This boy is smart, he'll succeed in life," and FIG. 11 shows its semantic structure.

The identification (260) of the ontological objects (FIG. 2A) happens as a result of ontological analysis on the semantic and syntactic structures using the corresponding rules. The goal of ontological analysis is automatic extraction of structured information from unstructured electronic documents. The analysis done at stages 710-740 and the transformation of unstructured text into syntactic and semantic structures makes it possible to extract information from a document that has already been structured, where the roles and sense of each element of text have already been determined.

An ontology (210) is a model of a domain field. An ontology is not the same as a semantic hierarchy, although it may be linked to elements of a semantic hierarchy by referential links. It is a formal description of some domain field. This description includes a formal description of the elementary (indivisible) units of a domain field (resources or examples), a formal description of various units (concepts, classes) of examples and a formal description of the links between examples. Ontologies may be inherited from each other. It is considered that all concepts, examples and relationships that belong to a parent ontology also belong to the descendant ontology. The basic elements of an ontology are concepts and examples.

A concept (class, information object) is a component of an ontology that reflects some concept in the domain field. A set of examples are joined into one concept. For example, all the examples corresponding to people are joined in the concept "person". Each concept in an ontology corresponds to a set of relationships that have this concept as a domain. This set determines what links an example of a given concept may have. In addition, the concept is tied to a set of simple limitations and a set of parent concepts. All of this also determines what the examples of a given concept can be.

An example is a component of a lower-level ontology. It usually reflects some objective reality (people, houses, planets, numbers, words, etc.). Each example pertains to a single concept. Each example is associated with a set of links. A preliminary semantic-syntactic analysis of texts in a corpus makes it possible to obtain syntactic and semantic structures for sentences from a corpus of texts with a semantic hierarchy and ontological descriptions, which in turn makes it possible to "extract" information about examples from the corpora analyzed.

Ontological rules are used to extract information from texts. Ontological rules are rules that describe how facts are expressed in texts. A preliminary semantic-syntactic analysis of texts using the technology described (FIG. 2A and FIG. 7A) makes it possible to describe and use ontological rules on structured data, and specifically on deep (semantic) structures taking into account the lexical, syntactic and semantic attributes extracted during initial parsing.

The universal representation obtained of the text information may be used to create or may be used by such natural language processing ("NLP") applications as Semantic Indexing, Semantic Search including Multilingual Semantic Search, Machine Translation, Similar Document Search, Fact Extraction, Sentiment Analysis, Document Classification, Summarization, Big Data analysis, eDiscovery, and similar applications. FIG. 1 shows an example of such a technology set that includes processing technologies based on a universal representation of text information.

The technology presented is based on two systems or platforms: 1) Natural Language Processing Technology (101), which includes at least a Morphology process block (102), a Syntax block (103), a Semantic block (104) and a Statistic block (105); and 2) Information Extraction Technology (110), which includes at least Triple Storage (111), Linked Entities (112) and inherently different types of Ontologies (113) that describe Named entities, Facts, Relations and other things. The Information Extraction Technology block of systems or programs (110) works with a Universal Semantic Tree (119) (structure) produced from the Natural Language Processing Technology (101) block.

Linked entities 112 are databases which are used to configure relationships between entities. An entity is a data structure that can be reused in multiple transactions. For example, the Address entity could be used as a shipping address, billing address, home address, and so on. Most entities also combine multiple data points into the structure for data optimization. The properties of a customer could include first name, last name, phone, and email entity properties. Entity is a configuration that defines a reusable data structure such as address.

An entity can be linked to another entity. A relationship is the association between entities. The Patient entity can be linked to another entity of type Address. The relationship between "Patient" and "Address" entities can be said to be one-to-one (1:1) because they have a one to one direct mapping. The Address entity is not dependant on the Patient and can reside by itself. It can be linked to other entities like Customers and Providers.

An entity can have many references to other entities. For instance, the "Patient" entity can have multiple instances of the "Address" entity like "Home Address," "Work Location" and so on. On the other had, "Patient" entity cannot have multiple home addresses.

Entities reduce configuration time since they are only set up once. This minimizes stored data. For example, a user's shipping address is saved in the database once and all transactions from the user refer to this instance. Entities increases processing speed because the data is saved as a hash and compared as such. At runtime the transaction will include this data and risk evaluations can be made against the data.

One task of NLP systems is automatic extracting of entities, their attributes with saving relationships between them from different NL sources. It also needs identifying the same objects, which may have different names or titles in different sources. When the NL data are represented in format of semantic strictures and indexed, it became possible to create special rules applied to such representation, to extract information and to store it to the databases. So, such information is stored in structural form and may be used by a wide spectrum of applications in different spheres.

A triple storage 111 is a purpose-built database for the storage and retrieval of triples, where a triple being a data entity composed of subject-predicate-object, like "John is 25" or "John knows Bob". Much like a relational database, one stores information in a triplestore and retrieves it via a query language. Unlike a relational database, a triplestore is optimized for the storage and retrieval of triples. In addition to queries, triples can usually be imported/exported using Resource Description Framework (RDF) and other formats.

The approach of the disclosed technology platform allows, using the unified representation of textual information in any language, such as a semantic structures, to extract and process the triples from the semantic structures automatically.

The schema represented in FIG. 1 include products and technologies that in and of themselves are a component of the technology described. Such a product, for example is the Morphology & Lexical Analyzer (106), which may be produced and delivered as a separate product, API, or Engine. Also, the Syntactic & Semantic Analyzer technology, which allows production of syntactically and semantically annotated texts and the universal structures associated with them (described in U.S. patent application Ser. No. 11/548,214, now U.S. Pat. No. 8,078,450 which is incorporated) may be produced as a separate product, API, or engine. The technology for creating Machine Translation Systems (107) for any pair of languages is described in applications and patents: U.S. patent application Ser. No. 11/690,102, now U.S. Pat. No. 8,195,447; U.S. patent application Ser. No. 11/690,104, now U.S. Pat. No. 8,214,199; U.S. patent application Ser. No. 12/388,219, now U.S. Pat. No. 8,145,473; U.S. patent application Ser. No. 13/407,729, now U.S. Pat. No. 8,412,513; U.S. patent application Ser. No. 13/626,722, now U.S. Pat. No. 8,442,810; U.S. patent application Ser. Nos. 11/690,099; 12/187,131; 13/288,953; 13/477,021; 13/528,716; 13/554,695; 13/626,480; 13/723,160, all of which are incorporated herein by reference in their entirety. The translation process consists of producing a language-independent semantic structure of a sentence in the source language and using it to synthesize a sentence in the target language.

A number of applications presume a search of documents that correspond to some query. In this case, a query is understood to mean some abstract criterion. The user knows approximately what documents he wants to find, formulates his demand to a search engine, receives a set of documents and looks at them (most often not in their entirety). This is a popular scenario for a user working with information. This scenario is carried out in all applications that are accompanied by a full-fledged system for extracting and monitoring information.

Currently search query languages, which let one indicate key words that must be in the documents retrieved, are most frequently used to formulate search criteria. This approach has turned out to be sufficiently comprehensible and convenient for users and not too complicated to implement. A drawback of search using key words is the large quantity of irrelevant information produced because it is impossible to formulate statements about the content (sense) of the documents.

An alternative approach to searching for documents is called a Semantic Search (108). In this approach, each document is perceived not as a flat sequence of symbols, but as a unit of content that includes a set of objects and facts. Search queries in this case are formulated using templates that formally specify what objects and facts must be found in the documents retrieved. In particular, a semantic search makes it possible to formulate a query not only by using key words, but in terms of retrieved lexical meanings (senses of the words) and to seek sentences with a specified syntactic or a specified semantic structure. Construction of semantic search systems based on the technology described herein is disclosed in U.S. patent application Ser. Nos. 12/983,220, 13/173,369, and 13/173,649, which are incorporated herein by reference.

A semantic search (108), like many other applications shown in FIG. 1 for semantic indexing (109), can also be produced as a separate product and may be used in other applications.

The quality and the ease of a semantic search depends substantially on the nomenclature of types of objects and facts that can figure in queries. It is also called a domain model (or a domain ontology). One advantages of a semantic search is the capacity to search multilingual collections of documents. Since a Universal Semantic Tree (104) is language-independent, the technology of the systems and method described herein makes it possible to do a search for information in collections of documents in different languages independently of the language of the query. The description of the Multilingual Semantic Search (110) is set forth in U.S. patent application Ser. No. 13/173,369, which is incorporated herein by reference.

The Fact Extraction Application (111) combines a whole range of information-extraction tasks. Before anything is done, this problem is "saturated" with facts (individuals) of the ontologies themselves. But this is more of a technology task, a task of improvement in and of itself. However, this process is used to solve problems that are of interest for users.

A whole series of applications call for monitoring documents that meet some criterion. Monitoring documents is understood to mean the process of operational extraction, from an information stream, of documents that meet some criterion. For example, tracking documents in which a certain company, product, person or something else is mentioned. Positive or negative ratings—Sentiment Analysis (112)—may be of interest separately. The situation with the selection criteria is analogous to the situation with searching for documents: the simplest variation is selection by key words, and a more intellectual (and more popular) variation is selection based on semantic criteria. The presence of a semantic index makes it possible to solve these problems—the semantic index stores not merely words but lexical meanings and semantic classes as well (including classes that combine the expression of positive and negative ratings with their syntactic models).

Monitoring is of interest first of all for corporations (monitoring competitors or following public opinion about the company) for organizations that are interested in public opinion and produce products or services. Monitoring scenarios may be sought for the ordinary user as well. Any person who is interested in a specific topic or field (simply reading news or being absorbed in science or auto racing or something else) can now frequently find that there is too much information about the subject he is interested in. In this, the user may have a system of priorities, i.e., an idea about what information he should look at first and what he can ignore or leave for later. Such a tool that allows a rough sorting of the incoming information using semantic criteria may be implemented as an RSS reader with semantic search functions (or as a plug-in with existing readers) or, for example, in the form of a plug-in to e-mail clients (sorting e-mail using semantics).

A developed semantic and ontological component of a system makes it possible to personalize—to adjust for the needs of a specific user. In addition to the capacity to show objects of monitoring, the system provides tools to show what properties the objects monitored must have and what the relationships between them can (must) be.

The presence of a semantic index allows for new capabilities of a system for monitoring information. The fact is that simple solutions (that "see" only the context of one document and store nothing) are in no way comparable to the problem of identifying unique objects in differing texts. That means that if, for example, the user while using such a solution wishes to collect documents mentioning Barack Obama, he will not obtain documents that mention President Obama (without a first name) or the US President. The use of a semantic index that indexes the entire information stream solves this problem.

The task of monitoring events using some criterion in a special case is of interest. This task is close to the task of monitoring documents (see above). The difference is the final goal: with monitoring documents, the user wants to see documents that meet a specified criterion, while with monitoring events, the accent moves to the actual events—it is important to the user that an event of a certain type (with certain properties) occurred, not what was written about it. For example, a subsystem for reporting on various interesting events as a part of a large information monitoring system. At any moment, the latest facts and events automatically extracted from the information stream can pop up on the main page for such a system.

Another task is eDiscovery (113), which may be done based on a semantic index as a search task based on a simple or a semantic criterion.

A separate task is the creation of Big Data Analysis systems (114), the solution of which requires the use of various methods—from classification and association rule learning to crowd sourcing and Spatial analysis. The semantic index is a serious aid to solve subtasks including, but not restricted to, classification, clustering, abstracting, seeking similar documents, and so forth.

Classification (115) of documents using a semantic index is described in detail in U.S. patent application Ser. No. 13/535,638, which is incorporated herein by reference in its entirety. Methods are described for performing classification (categorization) of text documents written in various languages. Language-independent semantic structures are constructed before classifying documents. These structures reflect lexical, morphological, syntactic, and semantic properties of documents. The methods suggested are able to perform cross-language text classification which is based on document properties reflecting their meaning. The methods are applicable to genre classification, topic detection, news analysis, authorship analysis, etc.

A system of Clusterization 115 of documents using semantic index is described in U.S. patent application Ser. No. 13/648,527, which is incorporated herein by reference in its entirety. Methods are described for performing clustering or classification of texts of different languages. A method for a computing device to analyze, across languages, a set of texts in one or more natural languages, the method comprising for each text: electronically analyzing the text, wherein the analysis includes performing steps including: performing a syntactic analysis of at least one sentence of the text; and creating a language-independent semantic structure by performing a semantic analysis of the sentence of the text; generating a set of features for the text, where at least one feature is based on the results of the said analysis; and performing text clustering based on said set of features, wherein the text clustering includes assigning the text to one or more clusters.

Similar Document Search 116 of documents using semantic index is described in U.S. patent application Ser. Nos. 13/672,064 и 13/662,272, which are incorporated herein by reference in their entirety. Described are methods for finding substantially similar/different sources (files and documents), and estimating similarity or difference between given sources. Similarity and difference may be found across a variety of formats. Sources may be in one or more languages such that similarity and difference may be found across any number and types of languages. A variety of characteristics may be used to arrive at an overall measure of similarity or difference including determining or identifying syntactic roles, semantic roles and semantic classes in reference to sources.

Summarization (117) of one or more documents works with a universal representation. If there is a deep structure for each sentence and algorithms have been worked out, the text is synthesized using an intellectual abstracting system, transforming and compressing deep structures in the text. In addition, the system works with objects and facts found in the text(s). After the factual information has been extracted from the text, it can be displayed again using synthesis algorithms. In the process, the richer the model for the domain field, the "more interesting" the abstracts obtained will be. The task of constructing a digest based on a certain selection of documents is solved analogously.

Figure 12:
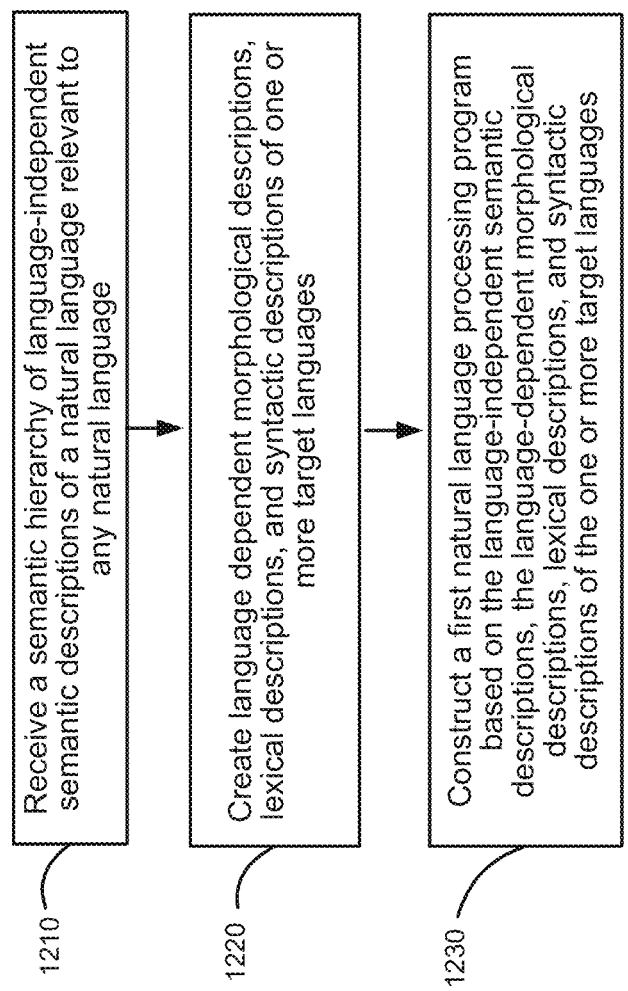
FIG. 12 is a flowchart of a process for creating a natural language program based on universal representation of textual information.

FIG. 12 is a flow chart of a process for creating natural language processing programs. At block 1210, a semantic hierarchy of language-independent semantic descriptions of a natural language relevant to any natural language is received. FIG. 5 illustrates exemplary semantic descriptions.

At block 1220, language dependent morphological descriptions, lexical descriptions, and syntactic descriptions of one or more target languages are created. FIG. 3 illustrates exemplary morphological descriptions, while FIG. 6 illustrates exemplary lexical descriptions. FIG. 4 illustrates exemplary syntactic descriptions.

A first natural language processing program is constructed (block 1230) based on the language-independent semantic descriptions, the language-dependent morphological, lexical, and syntactic descriptions of the one or more target languages, or any combination thereof. The natural language processing application may include, but not limited to, Semantic Indexing, Semantic Search including Multilingual Semantic Search, Machine Translation, Similar Document Search, Fact Extraction, Sentiment Analysis, Similar Document Search, Document Classification, Summarization, eDiscovery, and similar applications. FIG. 1 shows an example of such a technology set that includes processing technologies based on a universal representation of text information. In other embodiments, one or more natural language application may utilize the obtained universal representation.

Textual information may be received. The textual information may include any language information such as text documents, text corpora, data bases, images, social media, e-mails, subtitles, recognized speech, etc. The textual information may be received from another system or retrieved from storage or another system. The textual information may include multiple documents of the same or different type and/format. A universal representation corresponding to the textual information may be obtained. The universal representation may be generated based on the textual information. In some embodiments, the textual information may be subjected to specific processing based on exhaustive technologies using a large number of natural language and universal semantic descriptions. The information may be processed using analysis including lexical-morphological, syntactic, semantic and ontological stages of analysis with identification of the lexical and semantic meanings/values for each element of information, construction of the corresponding data structures at each stage, and extraction of the corresponding features and attributes at each stage. These data structures may be indexed and stored in memory.

As a result, any text information may be transformed into a universal representation and stored in a unified language-independent form, which is subjected to indexing with all the capabilities derived therefrom. The concepts and their attributes may be indexed, since any concept (i.e., an assertion expressed in universal terms) may be enumerated, recorded, and found (searchable). This universal representation of text information may be a unified platform for constructing practically any NLP application. In some embodiments, the universal representation may include semantic class information for each word in the textual information.

Thus, knowledge accumulated the system about the language(s) and the world (semantics) may utilized. The disclosed system provides integrity, comprehensiveness and universality. For example, it may be sufficient to construct linguistic descriptions of a new language according to the standards of the present approach (represented by this disclosure and a group of parent applications incorporated herein by reference), and not only one or more applications, but entire series of said applications become accessible.

Preliminary processing of a text corpus may include at least the following steps: identifying morphological values, identifying lexical meanings, identifying semantic meanings, identifying ontological objects, and indexing the values, parameters and attributes extracted. This may allow for use of a semantic index, rather than an ordinary one, in applications.

Figure 13:
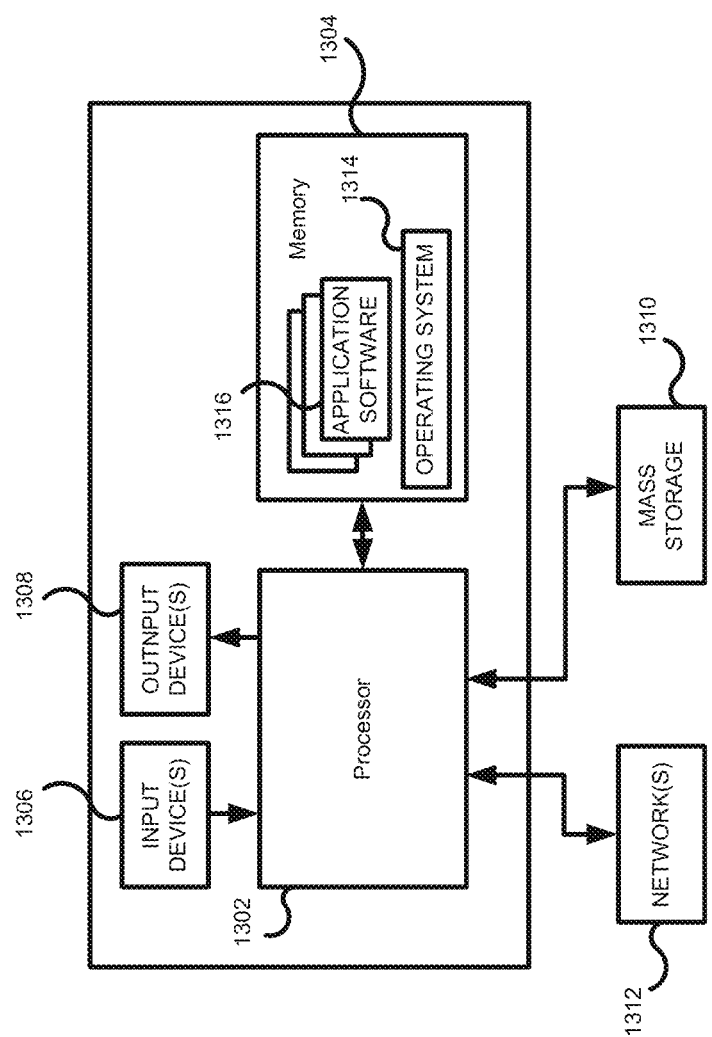
FIG. 13 illustrates exemplary hardware for implementing computer system in accordance with one embodiment.

FIG. 13 shows exemplary hardware for implementing the techniques and systems described herein, in accordance with one implementation of the present disclosure. Referring to FIG. 13, the exemplary hardware 1300 includes at least one processor 1302 coupled to a memory 1304. The processor 1302 may represent one or more processors (e.g. microprocessors), and the memory 1304 may represent random access memory (RAM) devices comprising a main storage of the hardware 1300, as well as any supplemental levels of memory (e.g., cache memories, non-volatile or back-up memories such as programmable or flash memories), read-only memories, etc. In addition, the memory 1304 may be considered to include memory storage physically located elsewhere in the hardware 1300, e.g. any cache memory in the processor 1302 as well as any storage capacity used as a virtual memory, e.g., as stored on a mass storage device 1310.

The hardware 1300 may receive a number of inputs and outputs for communicating information externally. For interface with a user or operator, the hardware 1300 may include one or more user input devices 1306 (e.g., a keyboard, a mouse, imaging device, scanner, microphone) and a one or more output devices 1208 (e.g., a Liquid Crystal Display (LCD) panel, a sound playback device (speaker)). To embody the present invention, the hardware 1300 may include at least one screen device.

For additional storage, the hardware 1300 may also include one or more mass storage devices 1310, e.g., a floppy or other removable disk drive, a hard disk drive, a Direct Access Storage Device (DASD), an optical drive (e.g. a Compact Disk (CD) drive, a Digital Versatile Disk (DVD) drive) and/or a tape drive, among others. Furthermore, the hardware 1400 may include an interface with one or more networks 1312 (e.g., a local area network (LAN), a wide area network (WAN), a wireless network, and/or the Internet among others) to permit the communication of information with other computers coupled to the networks. It should be appreciated that the hardware 1300 typically includes suitable analog and/or digital interfaces between the processor 1302 and each of the components 1304, 1306, 1308, and 1312 as is well known in the art.

The hardware 1300 operates under the control of an operating system 1314, and executes various computer software applications, components, programs, objects, modules, etc. to implement the techniques described above. Moreover, various applications, components, programs, objects, etc., collectively indicated by application software 1316 in FIG. 13, may also execute on one or more processors in another computer coupled to the hardware 1300 via a network 1312, e.g. in a distributed computing environment, whereby the processing required to implement the functions of a computer program may be allocated to multiple computers over a network.

In general, the routines executed to implement the embodiments of the present disclosure may be implemented as part of an operating system or a specific application, component, program, object, module or sequence of instructions referred to as a "computer program." A computer program typically comprises one or more instruction sets at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally to actually effect the distribution regardless of the particular type of computer-readable media used. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

While certain exemplary embodiments have been described and shown in the accompanying drawings, it is to be understood that such embodiments are merely illustrative and not restrictive of the broad invention and that the present disclosure is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modified or re-arranged in one or more of its details as facilitated by enabling technological advancements without departing from the principals of the present disclosure.

Implementations of the subject matter and the operations described in this specification can be implemented in digital electronic circuitry, computer software, firmware or hardware, including the structures disclosed in this specification and their structural equivalents or in combinations of one or more of them. Implementations of the subject matter described in this specification can be implemented as one or more computer programs, i.e., one or more modules of computer program instructions, encoded on one or more computer storage medium for execution by, or to control the operation of data processing apparatus. Alternatively or in addition, the program instructions can be encoded on an artificially-generated propagated signal, e.g., a machine-generated electrical, optical, or electromagnetic signal, that is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client" or "server" includes a variety of apparatuses, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, a code that creates an execution environment for the computer program in question, e.g., a code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, or a portable storage device (e.g., a universal serial bus (USB) flash drive). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well. For example, feedback provided to the user can be any form of sensory feedback, e.g., visual feedback, auditory feedback, or tactile feedback and input from the user can be received in any form, including acoustic, speech, or tactile input. In addition, a computer can interact with a user by sending documents to and receiving documents from a device that is used by the user. For example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown, in sequential order or that all illustrated operations be performed to achieve desirable results. In certain circumstances, multitasking and parallel processing may be advantageous. Moreover, the separation of various system components in the implementations described above should not be understood as requiring such separation in all implementations and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method for creating natural language processing programs, the method comprising:
   receiving, by a data processor, a semantic hierarchy of language-independent semantic descriptions of a natural language, wherein the semantic hierarchy is formed by identifying semantic notions and semantic values of words associated with lexical meanings of words;
   creating, by the data processor, language dependent morphological descriptions, lexical descriptions, and syntactic descriptions of one or more target languages; and
   constructing, by the data processor, for the target languages, a first natural language processing program based on the language-independent semantic descriptions, the language-dependent morphological descriptions, lexical descriptions, and syntactic descriptions of the one or more target languages, wherein the first natural language processing program is based on performing syntactical and semantic analysis of natural language sentences and creating a universal representation for at least one natural language sentence, and wherein the first natural language processing program includes instructions to perform natural language processing including at least one of: semantic analysis of the languages, semantic indexing, semantic search including multilingual semantic search, machine translation, similar document search, fact extraction, sentiment analysis, similar document search, document classification, summarization, or ediscovery.

2. The method of claim 1, further comprising constructing one or more additional natural language processing programs based on the language-independent semantic descriptions and using the language-dependent morphological descriptions, lexical descriptions, and syntactic descriptions of the target languages.

3. The method of claim 1, further comprising obtaining ontology information associated with the natural language sentences.

4. The method of claim 1, wherein the universal representation comprises a language independent semantic structure for each natural language sentence including semantic class information for each word in the natural language sentence.

5. The method of claim 4, wherein the language independent semantic structure is obtained based on exhaustive semantic-syntactic analysis.

6. A system comprising:
   a memory;
   one or more data processors coupled to the memory, the processors configured to perform operations comprising:
   receiving a semantic hierarchy of language-independent semantic descriptions of a natural language, wherein the semantic hierarchy is formed by automatically identifying semantic notions and semantic values of words associated with lexical meanings of words;
   creating language dependent morphological descriptions, lexical descriptions, and syntactic descriptions of one or more target languages; and
   constructing a first natural language processing program based on the language-independent semantic descriptions, the language-dependent morphological descriptions, lexical descriptions, and syntactic descriptions of the target languages, wherein the first natural language processing program is based on performing syntactical and semantic analysis of natural language sentences and creating a universal representation for at least one natural language sentence, and wherein the first natural language processing program includes instructions to perform natural language processing including at least one of: semantic analysis of the languages, semantic indexing, semantic search including multilingual semantic search, machine translation, similar document search, fact extraction, sentiment analysis, similar document search, document classification, summarization, or ediscovery.

7. The system of claim 6, further comprising constructing one or more additional natural language processing programs based on the universal representation.

8. The system of claim 6, further comprising obtaining ontology information associated with the natural language sentences.

9. The system of claim 6, wherein the universal representation comprises a language independent semantic structure for each natural language sentence.

10. The system of claim 9, wherein the language independent semantic structure is obtained based on exhaustive semantic-syntactic analysis.

11. The system of claim 6, wherein the first natural language program performs machine translation from a first natural language to a second natural language.

12. A non-transitory computer-readable storage medium having machine instructions stored therein, the instructions being executable by a processor to cause the processor to perform operations comprising:

receiving a semantic hierarchy of language-independent semantic descriptions of a natural language, wherein the semantic hierarchy is formed by identifying semantic notions and semantic values of words associated with lexical meanings of words;

creating language dependent morphological descriptions, lexical descriptions, and syntactic descriptions of one or more target languages; and creating at least one ontology and establishing links of its elements with elements of the semantic hierarchy; and constructing a first natural language processing program based on the language-independent semantic descriptions, the language-dependent morphological descriptions, lexical descriptions, and syntactic descriptions of the one or more target languages, wherein the first natural language processing program is based on performing syntactical and semantic analysis of natural language sentences and creating a universal representation for at least one natural language sentence, and wherein the first natural language processing program includes instructions to automatically perform natural language processing comprising at least one of: semantic analysis of the languages, semantic indexing, semantic search including multilingual semantic search, machine translation, similar document search, fact extraction, sentiment analysis, similar document search, document classification, summarization, or ediscovery.

\* \* \* \* \*